US011151081B1

(12) United States Patent
Anand

(10) Patent No.: US 11,151,081 B1
(45) Date of Patent: Oct. 19, 2021

(54) DATA TIERING SERVICE WITH COLD TIER INDEXING

(71) Applicant: Amazon Technologies, Inc., Seattle, WA (US)

(72) Inventor: Manu Anand, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 506 days.

(21) Appl. No.: 15/861,508

(22) Filed: Jan. 3, 2018

(51) Int. Cl.
*G06F 16/13* (2019.01)
*G06F 9/54* (2006.01)
*G06F 16/14* (2019.01)
*G06F 16/178* (2019.01)

(52) U.S. Cl.
CPC .............. *G06F 16/13* (2019.01); *G06F 9/544* (2013.01); *G06F 16/148* (2019.01); *G06F 16/178* (2019.01)

(58) Field of Classification Search
CPC ...... G06F 16/13; G06F 16/148; G06F 16/178; G06F 9/544
USPC ........................................................ 707/611
See application file for complete search history.

(56) References Cited

U.S. PATENT DOCUMENTS

| 5,404,510 | A | 4/1995 | Smith et al. |
|---|---|---|---|
| 5,918,225 | A | 6/1999 | White et al. |
| 6,502,088 | B1 | 12/2002 | Gajda et al. |
| 6,591,269 | B1 | 7/2003 | Ponnekanti |
| 6,778,977 | B1 | 8/2004 | Avadhanam et al. |
| 6,914,883 | B2 | 7/2005 | Dharanikota |
| 6,947,750 | B2 | 9/2005 | Kakani et al. |
| 8,135,763 | B1 * | 3/2012 | Compton .............. G06F 16/122 707/822 |
| 8,239,584 | B1 | 8/2012 | Rabe et al. |
| 8,595,267 | B2 | 11/2013 | Sivasubramanian et al. |
| 8,918,435 | B2 | 12/2014 | Sivasubramanian et al. |
| 9,092,151 | B1 * | 7/2015 | Floyd .................... G06F 16/215 |
| 9,165,015 | B2 * | 10/2015 | Kauffman ............... G06F 16/13 |
| 9,432,459 | B2 | 8/2016 | Sivasubramanian et al. |

(Continued)

OTHER PUBLICATIONS

U.S. Appl. No. 15/690,175, filed Aug. 29, 2017, Manu Anand.

(Continued)

*Primary Examiner* — Ashish Thomas
*Assistant Examiner* — Abdullah A Daud
(74) *Attorney, Agent, or Firm* — Robert C. Kowert; Kowert, Hood, Munyon, Rankin & Goetzel, P.C.

(57) ABSTRACT

A tiering service that supports cold tier indexing includes a warm tier and a cold tier and a resource manager that automatically relocates data items between the warm tier and the cold tier or removes data items from the cold tier in accordance with a tiering policy. The tiering service also includes a client interface configured to receive a request specifying index criteria for a cold tier index to be created. The tiering service generates a cold tier index based on data items stored in cold tier flat files satisfying the index criteria included in the request to create a cold tier index. Also, the tiering service automatically updates the cold tier index after it is stored in the cold tier as data items are relocated between the warm tier and the cold tier or removed from the cold tier in accordance with the tiering policy. In some embodiments, the tiering service also provides a common interface for accessing the cold tier index and a warm tier index.

20 Claims, 12 Drawing Sheets

(56) References Cited

U.S. PATENT DOCUMENTS

| | | | |
|---|---|---|---|
| 9,639,546 | B1 | 5/2017 | Gorski et al. |
| 9,754,009 | B2 | 9/2017 | Sivasubramanian et al. |
| 10,135,703 | B1* | 11/2018 | Gupta ................... H04L 43/067 |
| 10,404,787 | B1* | 9/2019 | Florissi ................. G06F 9/5083 |
| 2002/0087699 | A1 | 7/2002 | Karagiannis et al. |
| 2007/0195788 | A1 | 8/2007 | Vasamsetti et al. |
| 2008/0301087 | A1* | 12/2008 | Bernard .............. G06F 16/2272 |
| 2010/0121856 | A1* | 5/2010 | Lei .......................... G06F 16/13 |
| | | | 707/747 |
| 2012/0011338 | A1* | 1/2012 | Kobayashi ............ G06F 3/0632 |
| | | | 711/162 |
| 2012/0030179 | A1* | 2/2012 | Kauffman .............. G06F 16/248 |
| | | | 707/654 |
| 2012/0317155 | A1 | 12/2012 | Ogasawara et al. |
| 2016/0092793 | A1* | 3/2016 | Garrow ................. G06N 20/10 |
| | | | 706/12 |
| 2016/0321293 | A1* | 11/2016 | Auer ................... G06F 16/2228 |
| 2017/0177597 | A1* | 6/2017 | Asimenos .............. G16B 50/00 |
| 2017/0317882 | A1* | 11/2017 | Bitincka ............. H04L 41/0856 |
| 2018/0150485 | A1* | 5/2018 | Tripathy ............... G06F 16/1748 |
| 2019/0095534 | A1* | 3/2019 | Levine ................ G06F 16/9038 |
| 2019/0294637 | A1* | 9/2019 | Yamabana ........ G06F 16/90328 |
| 2019/0391991 | A1* | 12/2019 | Fujiwara ................. G06F 16/22 |

OTHER PUBLICATIONS

U.S. Appl. No. 15/866,332, filed Jan. 9, 2018, Manu Anand.
U.S. Appl. No. 16/367,100, filed Mar. 27, 2019, Binu Kuttikkattu Idicula.

* cited by examiner

DATA TIERING SERVICE WITH COLD TIER INDEXING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to clients. Some data center operators provide network access, power, and secure installation facilities for hardware owned by various clients, while other data center operators provide "full service" facilities that also include hardware resources made available for use by their clients.

As the scale and scope of distributed systems have increased, the tasks of provisioning, administering, and managing resources of the distributed systems have become increasingly more complicated. A distributed system referred to herein as a "provider network" may offer, to various clients, access to computing resources and services implemented using the distributed system. When clients access such resources remotely, the resources may be said to reside "in the cloud" and may represent cloud computing resources. For example, using such resources, the provider network may store data on behalf of clients in various types of storage solutions. The provider network may offer various types of services for managing the cloud computing resources, including storage-related services for managing stored data.

For various reasons, some pieces of data stored in a distributed system, such as a provider network, for a client may be accessed less frequently than other pieces of data. Also delays in access to some pieces of data stored in a distributed system for a customer may have less of an impact on the customer's operations than delays in accessing other pieces of data stored in the distributed system for the customer. As access requirements change, some pieces of data stored in a distributed system may end up being stored on resources that meet greater (and more costly) access requirements for the pieces of data than necessary to meet the customer's needs. For customers that store large quantities of such pieces of data, storage of the pieces of data in such higher performance resources may lead to an inefficient allocation of storage resources and unnecessary storage costs.

In some situations less frequently accessed pieces of data may be relocated to a lower cost storage. While such an arrangement may reduce storage costs, it may also remove the data from a pool of available data used for analytics and other purposes. It may also change the formatting of the data in ways that frustrate the use of analytical tools, such as business analytics software. For example, the less-frequently accessed pieces of data may be stored in the lower cost storage in a compact form that makes analysis and look-up of the less-frequently accessed pieces of data resource intensive and slow. Also, indexes, such as ones describing the data stored in the higher performance storage, may not be supported in the lower cost storage and any indexes included in the higher performance storage may not include the less frequently accessed pieces of data that have been relocated to the lower cost storage.

Figure 1A:
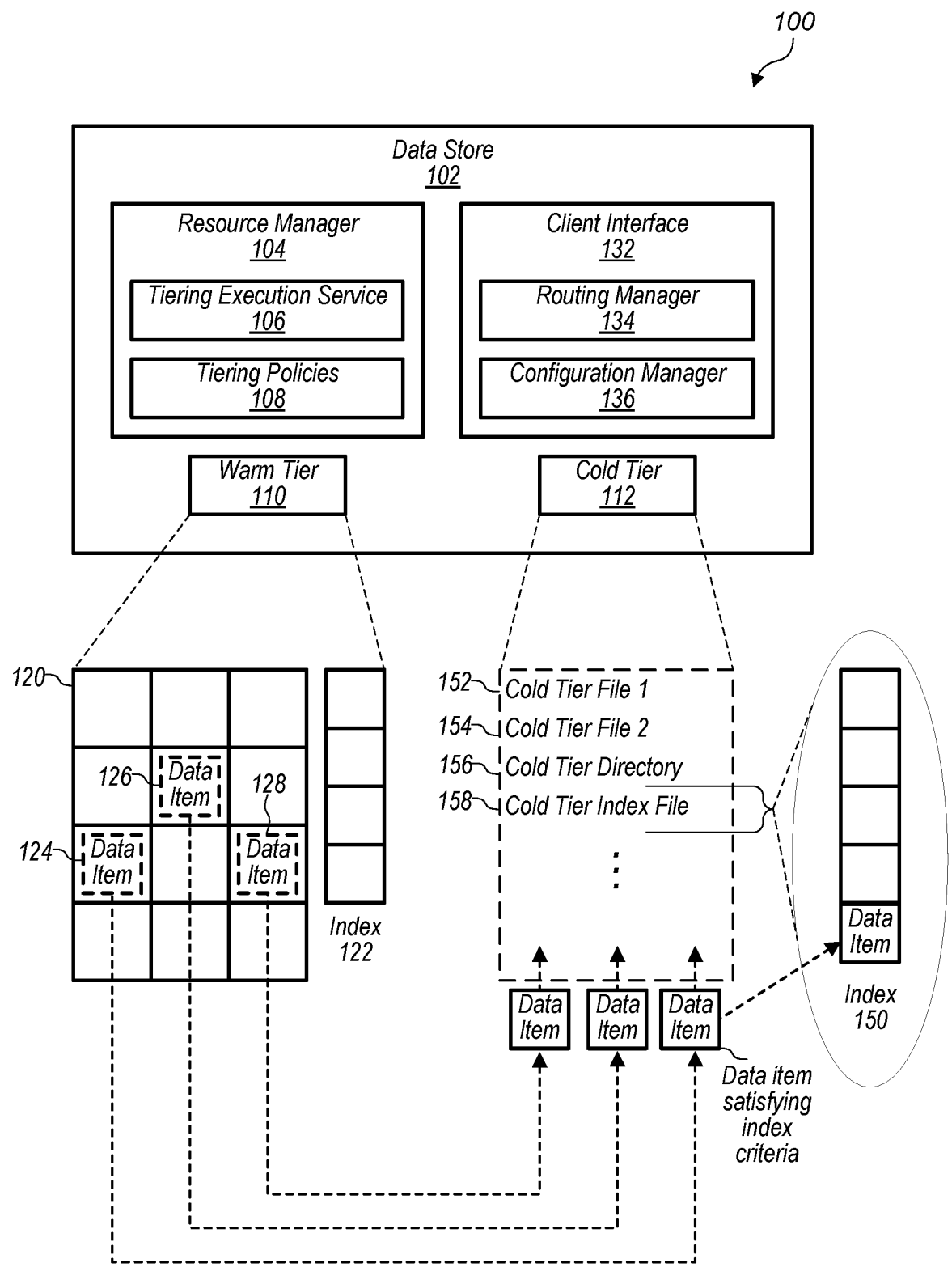
FIG. 1A illustrates a data store comprising a configuration manager and a resource manager that implement indexes in both a warm tier and a cold tier and that support automatically updating the indexes for data relocated between the warm tier and the cold tier, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a data tiering service with cold tier indexing are described herein.

In one embodiment, a system includes a data store comprising a warm tier and a cold tier, wherein the warm tier has a lower latency for data access than the cold tier. The cold tier stores one or more flat files comprising data items relocated from the warm tier to the cold tier and one or more cold tier directory files comprising identifiers for the relocated data items and respective storage locations in the one or more flat files where the relocated data items and respective storage locations in the one or more flat files where the relocated data items relocated from the warm tier to the cold tier are stored. The system also includes one or more computing devices implementing a configuration manager configured to receive, via a create cold tier index application program interface (API), a request to create a cold tier index for the cold tier, wherein the request indicates one or more index criteria for data items stored in the cold tier that are to be included in the cold tier index or indicates that one or more index criteria used in a warm tier index are to be applied to create the cold tier index. The configuration manager is also configured to generate a cold tier index in response to the request, search the one or more cold tier directory files and/or the one or more flat files of the cold tier for one or more data items satisfying the one or more index criteria for the requested cold tier index, and include the one or more data items satisfying the one or more index criteria in the cold tier index. In some embodiments, the configuration manager is also configured to generate a cold tier index directory file comprising identifiers for the one or more data items included in the cold tier index and respective storage locations in a cold tier index file where the one or more included data items are stored. In some embodiments, the cold tier index file may be a flat file similar to one of the other flat files of the cold tier.

In some embodiments, the system also includes a resource manager configured to relocate one or more data items from the warm tier to the cold tier in accordance with conditions included in a selected tiering policy for a client account and include one or more respective tombstones in the warm tier, each comprising an indication of a data item that has been relocated from the warm tier to the cold tier, wherein the respective indications included in the one or more tombstones are in accordance with a tombstone forwarding policy for the client account. The resource manager may be configured to trigger a synchronize index API of the configuration manager in coordination with relocating the one or more data items from the warm tier to the cold tier. In response to the synchronize index API being invoked, the configuration manager may be configured to determine if the one or more data items being relocated from the warm tier to the cold tier satisfy the one or more index criteria for data items to be included in the cold tier index. If the data items being relocated to the cold tier satisfy the one or more index criteria, the configuration manager may add a copy of the data items to the cold tier index file and update the cold tier index directory to include the one or more data items.

In some embodiments, synchronizing the cold tier index may be performed synchronously with relocating the one or more data items from the warm tier to the cold tier. For example, the one or more data items may be added to the cold tier index file and cold tier index directory file in conjunction with the one or more data items being added to a flat file of the cold tier and a cold tier directory for the cold tier. In some embodiments, synchronizing the cold tier index may be performed asynchronously with relocating the one or more data items from the warm tier to the cold tier. For example, the one or more data items being relocated may be first added to a flat file for the cold tier and a cold tier directory for the cold tier and may subsequently be added to a cold tier index file and a cold tier index directory file.

In some embodiments, the resource manager and the configuration manager may be included in a data storage system or may be a separate service that interacts with a data store to perform tiering and cold tier indexing as described herein.

In some embodiments, the routing manager of the system is configured to receive a request directed to a data item that has been relocated from the warm tier to the cold tier; locate a tombstone included in the warm tier corresponding to the data item that has been relocated to the cold tier; receive the data item stored in the cold tier, wherein the data item stored in the cold tier is accessed based on the indication of the location included in the tombstone in the warm tier; and provide the received data item in response to the request. Furthermore, the configuration manager may be configured to automatically update a cold tier index such that the cold tier index no longer includes a data item stored in the cold tier that has been superseded due to an update or modification to the data item being written to the warm tier. For example, the configuration manager or the routing manager may invoke a synchronize index API of the configuration manager that causes the cold tier index to be updated. In this way, the configuration manager may maintain a cold tier index such that the cold tier index remains accurate as data items are relocated between a warm tier and a cold tier of a data store, and as data items are deleted from the cold tier of the data store.

In some embodiments, a method includes storing data items in a cold tier of a data store, wherein the data store comprises a warm tier and the cold tier, and wherein the warm tier has a lower latency for data access than the cold tier. The method further includes receiving a request to create a cold tier index for at least some of the data items stored in the cold tier, wherein the request indicates one or more index criteria for data items to be included in the cold tier index. The method further includes adding one or more data items stored in the cold tier satisfying the one or more index criteria to a cold tier index created in response to the request. The method further includes storing the cold tier index in the cold tier; storing one or more additional data items in the cold tier, wherein the one or more additional items are data items relocated from the warm tier to the cold tier in accordance with a tiering policy for the data store; and automatically updating the cold tier index to include any of the one or more additional data items relocated to the cold tier that satisfy the one or more index criteria for the cold tier index.

In some embodiments, a non-transitory computer readable medium stores program instructions that, when executed by one or more processors, cause the one or more processors to: receive a request to create a cold tier index for data items stored in a cold tier of a data store, wherein the data store comprises a warm tier and the cold tier, wherein the warm tier has a lower latency for data access than the cold tier; generate a cold tier index for at least some of the data items stored in the cold tier in accordance with the request; and automatically update the cold tier index to include any additional data items stored in the cold tier in accordance with the request and to not include any data items no longer stored in the cold tier.

In some embodiments, various tiers of a data store, such as a warm (primary) tier, a cold (secondary) tier, or a secure tier may be implemented using different storage subsystems or services that may provide different storage characteristics. This may allow a client to store less frequently accessed data in a cheaper storage subsystem or service, while storing more frequently accessed data in a lower latency storage subsystem or service. Thus a client may be provided low latency access to frequently accessed data while reducing storage costs for infrequently accessed data. For example, a warm tier may be implemented using a NoSQL database system, while a cold tier may be implemented using an object-based storage system.

Typically, the warm tier may offer data access with lower latency than the cold tier. Due to the differing cost and performance characteristics of the tiers, the warm tier may be used to store more frequently accessed data and may be referred to as a "primary" tier, while the cold tier may be used to store less frequently accessed data (typically in larger quantities) and may be referred to as a "secondary" tier. Also, a secure tier may encrypt or otherwise protect a client's data stored in the secure tier. The data store and its constituent tiers may offer multi-tenancy to clients, e.g., clients of a provider network. Accordingly, the data store may also be referred to as a multi-tenant data store. The data store and its constituent tiers may offer dynamic sizing to clients such that the available capacity for a particular client's storage needs may be increased dynamically, e.g., using storage resources from a provider network. The data store may include any suitable number and configuration of storage tiers implemented using any suitable storage subsystems and/or storage services. In one embodiment, the type, number, and/or configuration of the different storage tiers may be configured by a client of the data store. Additionally, policies for using the various tiers (e.g., policies for deciding which tier to use for storing a particular data item) may be configured by a client of the data store.

The various tiers of a data store may store data items on behalf of a plurality of clients (also referred to herein as tenants or clients). The data items may be structured differently in different tiers. For example, in the warm tier, the data items may include key-value pairs and associated meta-data, and the key-value pairs may be organized into data structures referred to as scopes or tables. The data items (e.g., key-value pairs) and/or data structures that contain them (e.g., scopes or tables) may be specific to particular clients, such that a particular data item or data structure may be said to belong to a particular client or to be owned by a particular client. The client that owns particular data items may have access to read, write, or modify those data items, in some cases exclusive of other clients. As another example, in the cold tier or secondary tier, the data items may be structured as objects and stored in secure, durable, highly scalable object storage in storage locations referred to as "buckets." A storage service object, for example, may include data, a key, and metadata; the object key (or key name, or identifier) which uniquely identifies the key-addressable object in a bucket, and an index of such keys. In some embodiments, the cold tier may represent block-based storage (e.g., of 64 kilobyte blocks). In some embodiments, a single storage service object stored in the cold tier may include multiple data items in the storage object, wherein the data items are key-value pairs with associated meta-data that have been relocated from the warm tier to the cold tier.

Clients may use devices to perform or request suitable operations for reading, writing, or modifying data items in a data store. The data store may expose a client interface to enable clients to participate in such operations. In some embodiments, a client interface may represent a single, unified interface to all the tiers (e.g., the warm tier, cold tier, and/or the secure tier(s)). The client interface may include any suitable user and/or programmatic interfaces, such as application programming interfaces (API) enabling operations such as "put" and "get." In some embodiments, the client interface may receive requests to create indexes in both the warm tier and the cold tier. Also, in some embodiments, indexes stored in the warm tier and cold tier may be accessed via the client interface. For example, a business analytics application may access cold tier indexes via the client interface. In some embodiments, a configuration manager of a client interface may include various APIs for creating, modifying, moving, copying, or deleting a cold tier index. In some embodiments, a configuration manager may also include an API for listing data items included in a cold tier index. Also, a configuration manager or other component of a cold tier may comprise a synchronize index API, which may be an internal API that is invoked, when data items are relocated into the cold tier or data items in the cold tier are superseded or removed, in order to update one or more indexes of the cold tier.

In some embodiments, the tiers of a data store may be provided using one or more storage-related services, such as a relational database service, a non-relational or NoSQL database service, an object storage service that allows clients to store arbitrary amounts of data in the form of objects, a storage service that provides block-device level interfaces, and so on. A client of such a storage-related service may programmatically request the establishment of a portion of a data store, such as an instance of a (relational or non-relational) database that can be used for numerous database tables or scopes and associated metadata such as indexes and the like. In the case of an object storage service, at least a portion of a data store may include a collection of objects. In the case of a storage service providing block-device interfaces, the corresponding tier of the data store may be implemented using one or more volumes.

Generally speaking, the term "data store," as used herein, may refer to a collection of one or more data items and/or data objects and associated metadata set up on behalf of one or more clients. After a data store has been created, a client may start populating various data items within the data store, e.g., using requests for operations such as "create object," "update object," "insert object," "delete object," or other similar requests at various granularity levels depending on the data store type. For example, in the case of a database, operations such as creates, updates, and deletes may be supported at the table level, the data item level, and for various metadata objects such as indexes, views, and the like. Clients may also issue read requests of various kinds, such as queries in the case of database objects.

Also a client may control conditions that cause the client's data to be relocated between a warm tier and a cold tier or between secure tiers of a data store by selecting a tiering policy from a plurality of tiering policies supported by the data store. Additionally, a client may control how data that has been relocated from a warm tier to a cold tier or between secure tiers is accessed by selecting a tombstone forwarding policy from among a plurality of tombstone forwarding policies supported by the data store.

Furthermore, in some embodiments a client may specify one or more criteria for data items stored in a cold tier to be included in a cold tier index being requested. For example, a client may specify that data objects with key values, greater than, less than, or equal to a certain value are to be included in the cold tier index. Alternatively the client may specify that data items having item values greater than, less than, or equal to a certain value are to be included in the cold tier index. Also, a client may specify that data objects having associated meta-data greater than, less than, or equal to a certain value are to be included in the cold tier index. In some embodiments, a client may be able to specify a similarity criteria for data items to be included in a cold tier index. In some embodiments, a client may specify a warm tier index and indicate that a cold tier index to be created is to inherit the same or similar index criteria as the warm tier index. In some embodiments, a cold tier index may be organized based on key-values for data items included in the cold tier index. In other embodiments, a cold tier index may be organized based on item-values for data items included in the cold tier index. In yet other embodiments, a cold tier index may be organized based on meta-data values for data items included in the cold tier index.

In some embodiments, a request to create a cold tier index may indicate that the cold tier index is to be a compact index. A compact cold tier index may include references for data items included in the cold tier index but may not include key-values, item-values and meta-data values for the data items included in the cold tier index. For example, a compact cold tier index may include a reference to a data item in a cold-tier directory, wherein the cold tier directory indicates a location in a cold tier flat file where the referenced data item is stored. The flat file may include the data item along with the data item's key-value, item value and associated meta-data. In other embodiments, a compact cold tier index may include key values for data items included in the compact cold tier index, but may not include the corresponding item values and meta-data for the data items. In such an embodiment, the key values included in the compact cold tier index may be used to locate the data items in a cold tier directory file that indicates a storage location in a flat file where the respective data items are stored along with the respective data items' key-values, item-values and associated metadata.

Illustrative System Configuration

Some data stores that support tiering data between a warm tier and a cold tier may only support indexing of data stored in the warm tier. Also, because warm tier storage is more expensive than cold tier storage, such systems may only support a limited number of indexes in the warm tier. Additionally, in such systems, data items stored in a cold tier may not be accounted for in warm tier indexes. Thus, applications using the warm tier indexes to perform analysis, such as business analytics, may not take into account data items stored in the cold tier. In order to address this issue, some data store operators may generate customized code to allow applications, such as business analytics, to access cold tier data. However, such specialized code may be specific to a particular configuration and may have to be custom designed for each use. Moreover, standardized applications, such as commercially available business analytics programs, may not be operable with such systems. Also, even using such specialized code, retrieving data from a cold tier in such systems may be slow and costly in terms of computing resources. For example, because the cold tier data is not indexed, whole tables may need to be scanned to find relevant data. Also, in such systems, when a data item is to be relocated back to a warm tier, for example in response to a request directed to the data item being received at the warm tier, a large portion of the cold tier data may have to be scanned to locate the requested data item. This too may result in high overhead processing costs and high latency.

In order to address such issues and other issues, a data tiering service with cold tier indexing may allow a client to request cold tier indexes be generated and stored in the cold tier. Because cold tier storage is relatively cheap compared to warm tier storage, a client may inexpensively store a large number of indexes in a cold tier as compared to a number of indexes a client may be allowed to store in a warm tier for similar costs. Also, a data store may include a common client interface for accessing indexes included in the warm tier and the cold tier. Thus, an application, such as a business analytics application, may access cold tier indexes and warm tier indexes seamlessly without customized code to allow access to the cold tier indexes. Moreover, because the cold tier may include multiple cold tier indexes organized in ways that make data retrieval more efficient, an application, such as a business analytics application, may perform analysis of cold tier data at a lower overhead cost and more quickly than in systems that do not support cold tier indexes.

Moreover, a configuration manager of a data tiering service that supports cold tier indexing may automatically update cold tier indexes as data items are relocated into the cold tier from the warm tier, for example as the data items age. Also, the configuration manager may update cold tier indexes to no longer include data items that have been removed from the cold tier, for example data items that have been promoted to the warm tier and deleted from the cold tier. Thus, a data tiering service with cold tier indexing may maintain up-to-date cold tier indexes that may be used to perform analysis or other operations. Also, when data items are to be relocated from the cold tier to the warm tier of a data store that uses a tiering service with cold tier indexing, the data items may be more quickly located with less overhead costs because cold tier indexes may be used by a resource manager to locate the data items to be promoted to the warm tier without having to scan through large portions of one or more cold tier directory files to locate the data items to be promoted.

Additionally, in some embodiments, cold tier indexes may be exposed to clients for various other uses, such as cold tier searching.

In some embodiments, a data tiering service with cold tier indexing as described herein may be a standalone service that coordinates tiering and indexing of data stored in one or more separate warm storage systems and one or more separate cold storage systems. Also, a data tiering service with cold tier indexing may coordinate tiering of data between separate services such as a database service and a higher latency storage service. In other embodiments, a data tiering service with indexing may be included in or integrated into a data store that includes a plurality of different storage tiers.

For example, FIG. 1A illustrates a data store comprising a configuration manager and a resource manager that implement indexes in both a warm tier and a cold tier and that support automatically updating the indexes for data items relocated between the warm tier and the cold tier, according to some embodiments.

Configuration manager 136 and resource manager 104 are shown integrated into data store 102. However, in some embodiments, resource manager 104 and configuration manager 136 may be included as a stand-alone service that is separate from a data store, such as data store 102, and that interacts with the data store or tiers of the data store to implement client specified tiering policies, indexing policies and/or other client specified policies for the data store.

System 100 as illustrated in FIG. 1A includes data store 102, but may also include additional services. For example, in some embodiments, system 100 may be a provider network that includes additional computing, storage, or networking resources or other services offered to clients in addition to services associated with data store 102.

Data store 102 includes warm (primary) tier 110, and cold (secondary) tier 112. In some embodiments, warm tier 110 may be a database system and cold tier 112 may be an object-based data storage system. The warm tier 110 may typically be more expensive per unit of data stored and may have lower latency for data access than the cold tier 112. For example, in some embodiments warm tier 110 may be configured in accordance with various database formats or protocols, such as Aerospike, ArangoDB, Couchbase, Amazon Dynamo DB, FairCom c-tree ACE, Foundation DB, HyperDex, InfinityDB, MemcacheDB, MUMPS, Oracle NoSQL Database, OrientDB, Redis, Riak, Berkley DB, Google Engine, etc. In some embodiments, cold tier 112 may be implemented utilizing a lower cost storage service than is used for the warm tier 110, such as Amazon's Simple Storage Service (S3) or Amazon Glacier, as some examples. In some embodiments, data store 102 may include more than two tiers, e.g. a data store may include one or more additional lower tiers that have higher latencies and lower costs than the cold tier.

Data store 102 also includes client interface 132 and resource manager 104. In some embodiments resource manager 104 and client interface 132 may be included in a data store or, in other embodiments, client interface 132 and/or configuration manager 136 of client interface 132 and resource manager 104 may be included in a service that is separate from a data store and that interacts with a data store or data stores to cause data stored in the data store(s) to be tiered between warm and cold tiers and related cold tier and warm tier indexes to be updated in response to the data being tiered between the warm and cold tiers.

Figure 1B:
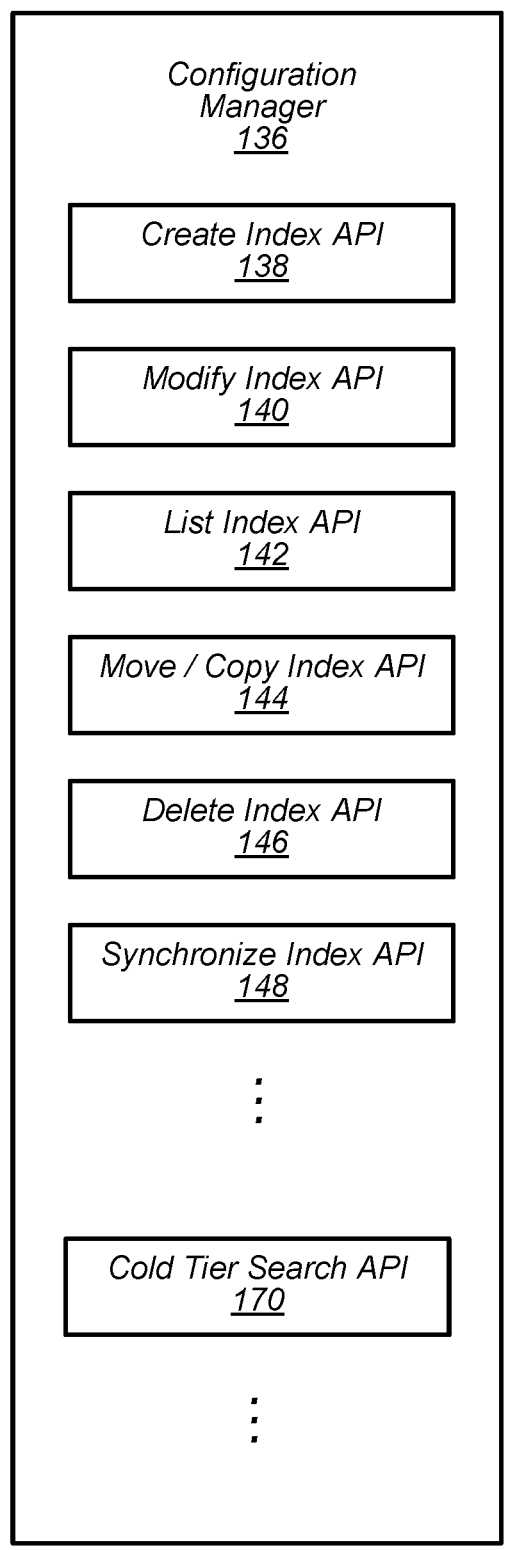
FIG. 1B is a more detailed view of APIs included in a configuration manager of a client interface, according to some embodiments.

Client interface 132 includes configuration manager 136 and routing manager 134. Configuration manager 136 may implement a programmatic interface configured to receive database policy selections, tombstone forwarding policy selections, tiering policy selections, tiering scheduling policy selections, warm tier index creation requests, cold tier index creation requests, various indexing API calls as described herein, and various other database policy selections from a client of a data store or from a client of a client-configurable data tiering service. For example, FIG. 1B illustrates cold tier index related APIs that may be implemented via a configuration manager, such as configuration manager 136.

In some embodiments, a resource manager, such as resource manager 104, may include a policy depository that stores policies, such as policies 108, that are supported by a data store, such as data store 102. A resource manager, such as resource manager 104, may also include an execution engine, such as tiering execution service 106. In some embodiments a tiering execution service or tiering engine executes tiering of data between a warm tier and a cold at defined time intervals in accordance with selected tiering policies specified by a client of a data store or a client of a client-configurable data tiering service that supports cold tier indexing.

In some embodiments, a tiering execution service, such as tiering execution service 106, may reach an execution interval for the tiering execution service, for example daily execution intervals or weekly execution intervals, and upon reaching the execution interval, the tiering execution service may evaluate a client's selected tiering policies to determine if any of the client's tables are ripe for tiering. If so, the tiering execution service may then determine data items included in the ripe tables or scopes that are to be relocated to a cold or secondary tier in accordance with the client's selected tiering policy or policies.

For example, FIG. 1A illustrates client table 120 stored in warm tier 110. Warm tier 110 also stores a warm tier index 122 for client table 120. The warm tier index may include a portion of the data items of client table 120 organized according to a different column attribute than a column attribute according to which the data items are organized in the client table 120.

Also, as shown in FIG. 1A, client table 120 includes data items 124, 126, and 128 that are ripe for tiering to cold tier 112. For example, data items 124, 126, and 128 may have associated conditions (such as age, for example) that satisfy one or more tiering criteria of a tiering policy selected for client table 120. In some embodiments, a tiering execution service, such as tiering execution service 106 of resource manager 104, may determine that data items 124, 126, and 128 are to be tiered to the cold tier 112 and may send an indication to a configuration manager, such as configuration manager 136, to relocate data items 124, 126, and 128 to cold tier 112.

In some embodiments, a cold tier, such as cold tier 112, may be an object based storage system that stores blobs of data as objects, wherein the objects are flat files without an internal hierarchy. In such embodiments, a cold tier may include one or more cold tier files that store data for multiple data items that have been relocated from the warm tier to the cold tier. The cold tier may also include at least one cold tier directory that indicates where data for respective ones of the data items are stored in the one or more cold tier files. For example, the cold tier directory may be organized based on data item key-values wherein the cold tier directory includes a key-value for each data item stored in the cold tier or a portion thereof. The cold tier directory file may also include a corresponding location in a cold tier file where data for a data item having a respective key-value is stored. For example, cold tier 112 includes cold tier files 152 and 154 and cold tier directory file 156. In some embodiments, a cold tier directory may not be optimized for performing certain types of searches or analytics. This is because the cold tier directory may be organized by keys (and may not be organized based on item values or meta-data values). Furthermore, the cold tier directory may not include item values or meta-data values. Instead, in order to determine an item value or meta data value for a particular data item having a particular key included in the cold tier directory, it may be necessary to locate the key for the data item in the cold tier directory and then locate data for the data item stored in one of the cold tier files at a location indicated in the cold tier directory in order to determine an item-value or meta-data value for the data item having the particular key-value.

In some embodiments, a cold tier index may be added to a cold tier to improve access to cold tier data. Also, because cold tier storage is relatively inexpensive as compared to warm tier storage, multiple cold tier indexes may be included in a cold tier at low cost. For example, a cold tier may include multiple indexes organized according to multiple column attributes. Thus, analysis and searching of cold tier data may be performed more quickly and with less searching than in systems that do not support cold tier indexes.

In some embodiments, a configuration manager of a data store, such as configuration manager 136, may automatically update a cold tier index when data items are relocated to a cold tier and promoted from a cold tier back to a warm tier or superseded in the cold tier by an update to a data item being performed at the warm tier. Also, a configuration manager, such as configuration manager 136, may update a cold tier index when data items are deleted from a cold tier or otherwise removed from a cold tier.

As shown in FIG. 1A configuration manager 136 adds data items 124, 126, and 128 to cold tier 112, wherein resource manager 104 has indicated that data items 124, 126, and 128 are to be relocated from the warm tier 110 to the cold tier 112. Also, in the case of data item 124, configuration manager 126 determines that data item 124 satisfies one or more index criteria for cold tier index 150 and automatically adds data item 124 to cold tier index file 158 either synchronously with adding data items 124, 126, and 128 to cold tier 112 or subsequent to adding data items 124, 126, and 128 to cold tier 112.

Also, in the case of data items that are being relocated from a cold tier back to a warm tier, cold tier indexes, such as cold tier index 158 may provide sorting to increase a speed at which a data item to be relocated back to the warm tier is located by a configuration manager, such as configuration manager 136.

Also, in some embodiments, a client interface, such as client interface 132, may provide a common interface for creating, modifying, accessing, etc. indexes in the warm tier 110, such as index 122, and indexes in the cold tier, such as index 150. In some embodiments, a client may specify one or more index criteria for data items that are to be included in a cold tier index, such as cold tier index 150, or may specify that the cold tier index is to inherit one or more index criteria of a warm tier index. For example a client may specify that cold tier index 150 is to inherit the index criteria of warm tier index 122.

Example Cold Tier Indexing APIs Included in a Configuration Manager

FIG. 1B is a more detailed view of APIs included in a configuration manager of a client interface, according to some embodiments.

In some embodiments, configuration manager 136 shown in FIG. 1B may be the same configuration manager as configuration manager 136 shown in FIG. 1A. In some embodiments, a configuration manager may include APIs for managing cold tier indexes. In some embodiments, a configuration manager of a data store may include a create cold tier index API, a modify cold tier index API, a list cold tier index API for listing data items included in a cold tier index, a move/copy cold tier index API, a delete cold tier index API, an internal synchronize cold tier index API, and one or more other APIs for managing cold tier indexes.
Create Cold Tier Index API In some embodiments, a create cold tier index API, such as create cold tier index API 138, may allow a client to select a column of a NoSQL table, for example a of a table as stored in the warm tier, such as a column of table 120 stored in warm tier 110. The selected column may have a column attribute associated with the column. The column attribute of the selected column may define item value attributes for data item included in the column of the table and may also define item value attributes for data items to be included in the cold tier index. For example, a table may include rows where each row is defined by a unique key. Each data item included in the table may be defined by a key-value pair where the key-value of the row and an item-value of a column attribute intersecting the row define the key-value pair for the data item. Furthermore, each data item may include one or more associated pieces of meta-data. Thus, by selecting a column of a table, the client may narrow the index to data items having item-values of a type corresponding to the column attribute.

Furthermore, a create cold tier index API, such as create cold tier index API 138, may allow a client to further narrow which data items are to be represented in the cold tier index. The create cold tier index API may also further allow a client to specify how a cold tier index is to be organized. For example a cold tier index may be organized based on key-values for data items included in the cold tier index, item-values of the data items included in the cold tier index, or one or more meta-data values for data items included in the cold tier index.

For example, in some embodiments, a create cold tier index API may take as inputs:
 a.) a table name for a table the cold tier index provides an index for;
 b.) a selected column attribute of the table;
 c.) an index organization criteria, such as "key-values", "item-values", or "meta-data values";
 d.) an index comparator, such as <, >, =, or ≈;
 e.) a comparison value, for example an absolute value against which keys-values, item-values, or meta-data values of data items included in the table are to be compared using the index comparator to determine if the data items are to be included in the index;
 f.) an index limit, such as a maximum number of data items that are to be represented by the index. For example: "limit the index to 100 results"; and
 g.) an indication as to whether the requested col tier index is to be a compact index or a non-compact index.

In response to receiving a request comprising the input parameters outlined above, a configuration manger may determine one or more index criteria for data items to be included in the requested cold tier index, and may generate a cold tier index that includes data items that satisfy the one or more index criteria.

In some embodiments, a create cold tier index request may specify a table name, and an existing warm tier index that is to be replicated in the cold tier. In response to receiving such a request, a configuration manager may query the warm tier index to determine the index criteria of the warm tier index and may apply the same index criteria of the warm tier index to data items stored in the cold tier to identify data items stored in the cold tier to include in the requested cold tier index in accordance with the inherited index criteria inherited from the warm tier index. In some embodiments, the request may further specify an index limit for the cold tier index and an indication as to whether the cold tier index is to be a compact index or a non-compact index.

In some embodiments, a configuration manager, such as configuration manager 136, may generate a cold tier index file and populate the cold tier index file with data items satisfying the index criteria for the requested cold tier index that is to be generated. In some embodiments, the cold tier index may be stored in a same partition of the cold tier as the cold tier files that include the data items being included in the cold tier index. Because the cold tier index is stored in a same partition as a client's cold tier data, the same access rules that allow the client to access the client's cold tier data may also allow the client to access the cold tier index.
Modify Cold Tier Index API In some embodiments, a configuration manager, such as configuration manager 136, may further include a modify index API, such as modify index API 140. A modify index API may take similar inputs as the create cold tier index API 138, described above, and may allow a client to change one or more index criteria for an existing cold tier index. Functionally, the modify index API may cause a previously created cold tier index to be replaced with a new cold tier index having the modified index criteria as defined via the modify index API.

List Cold Tier Index API

In some embodiments, a configuration manager, such as configuration manager 136, may further include a list cold tier index API, such as list cold tier index API 142. A list cold tier index API, may return a list of data items included in a cold tier index. For example, a client may specify an index name as an input to a list cold tier index API, and the list cold tier index API may return one or more pages listing data items included in the index. In some embodiments, a number of results to be included per page may be specified and/or a starting page for results may be specified, for example via the list cold tier index API.

Move/Copy Cold Tier Index API

In some embodiments, a configuration manager, such as configuration manager 136, may further include a move/copy cold tier index API, such as move/copy cold tier index API 144. A move/copy cold tier index API may take as inputs an index name and a destination storage location. The move/modify cold tier API may cause a copy of the cold tier index to be created at the designated location. In some embodiments, a move/copy cold tier index API may be used to create replicas of cold tier indexes, for example to increase redundancy of cold tier data and/or to archive previous states of the cold tier index. In some embodiments, a move/copy cold tier index API may further take as an input an indication of a file type for the moved/copied cold tier index and an indication as to whether the existing cold tier index is to be deleted after the cold tier index is copied to the destination location. In some embodiments, supported file types for copied cold tier indexes may include: comma separated values (csv), tab separated values (tsv), back-up data base (.bdb), or another type of flat file.

Delete Cold Tier Index API

In some embodiments, a configuration manager, such as configuration manager 136, may further include a delete cold tier index API, such as delete cold tier index API 146. A delete cold tier index API, may take a cold tier index name as an input and may cause the cold tier index to be deleted from the cold tier.

Synchronize Cold Tier Index API

In some embodiments, a configuration manager, such as configuration manager 136, may further include a synchronize cold tier index API, such as synchronize cold tier index API 148. A synchronize cold tier index API may be an internal API that is not exposed to clients of the data store and may be invoked by a resource manager, such as resource manager 104, when data items are relocated from the warm tier to the cold tier or promoted back to the warm tier from the cold tier. In some embodiments, synchronizing a cold tier index may be performed synchronously with relocating data items to a cold tier or promoting data items back to a warm tier. When cold tier index synchronization is performed synchronously with relocation or superseding of data items, an input to a synchronize cold tier index may be a key-value for a data item being added to the cold tier or a key-value for a data item being removed from the cold tier.

In other embodiments, synchronizing a cold tier index may be performed asynchronously with relocating data items to a cold tier or promoting data items back to a warm tier or otherwise removing data items from the cold tier. In such embodiments, an input to a synchronize cold tier index API may be a name of a file comprising a list of key values for data items added to the cold tier or removed from the cold tier.

In the case of synchronous updating of a cold tier index, a configuration manager, such as configuration manager 136, may update a cold tier index, such as cold tier index 150, synchronously with adding each data item to the cold tier, such as cold tier 112, or removing each data item from the cold tier. In the case of asynchronous updating of a cold tier index, the configuration manager may perform multiple updates to a cold tier index for multiple data items concurrently or sequentially after the data items have already been added to the cold tier or removed from the cold tier.

In some embodiments, a client may select asynchronous cold tier updating in order to reduce processing overhead associated with updating the cold tier index each time a data item is added to or removed from the cold tier. Also asynchronous cold tier updating may reduce a latency of performing a tiering operation as compared to a synchronous updating of a cold tier index. However, when asynchronous updating is selected there may be some instances where a cold tier index is out of date and does not include data items that have been added to the cold tier (for example, during a time between a tiering operation and completion of an asynchronous cold tier update). Depending on a use of a cold tier index, some clients may prefer a higher level of consistency associated with synchronous cold tier updating, despite added processing costs and latency.

In some embodiments, a configuration manager, such as configuration manager 136, may further include additional APIs for managing cold tier indexes.

In some embodiments, a configuration manager, such as configuration manager 136, may further include one or more additional APIs for searching a cold tier using cold tier indexes. For example, configuration manager 136 includes cold tier search API 170. A cold tier search API, such as cold tier search API 170, when invoked, may cause one or more cold tier indexes to be created to support searching of the cold tier. For example, based on a search request, a cold tier search API may cause one or more cold tier indexes to be created that target particular column attributes in order to support a search of the cold tier data. In some embodiments, the generated cold tier indexes may be generated based on index criteria, result formats, and other index parameters that improve searching. In some embodiments, index criteria, result formats, etc. may be selected for cold tier indexes based on a particular search or type of search the cold tier indexes are to support. Creating indexes for searching cold tier data may reduce search times as compared to searches performed without indexes. In some embodiments, a set of one or more indexes may be created to perform a particular search or type of search and may be deleted after the search is completed or after a certain amount of time has passed. In such embodiments, a cold tier search API may cause the indexes to be created and may cause the indexes to be deleted when no longer needed for searching.

In some embodiments, a client may specify criteria for cold tier search indexes via a cold tier search API, such as cold tier search API 170. For example, a client may specify index criteria for a cold tier search index, column attributes for data items to be included in the cold tier search index, an amount of time for which the cold tier search index is to be maintained, etc. For example, a cold tier search index may be automatically deleted after a pre-determined amount of time or in response to a triggering event.

In some embodiments, search results based on searches performed on cold tier data, for example via cold tier search API 170, may be automatically updated as data items are relocated to the cold tier from the warm tier and as superseded data items are removed from the cold tier.

Figure 2A:
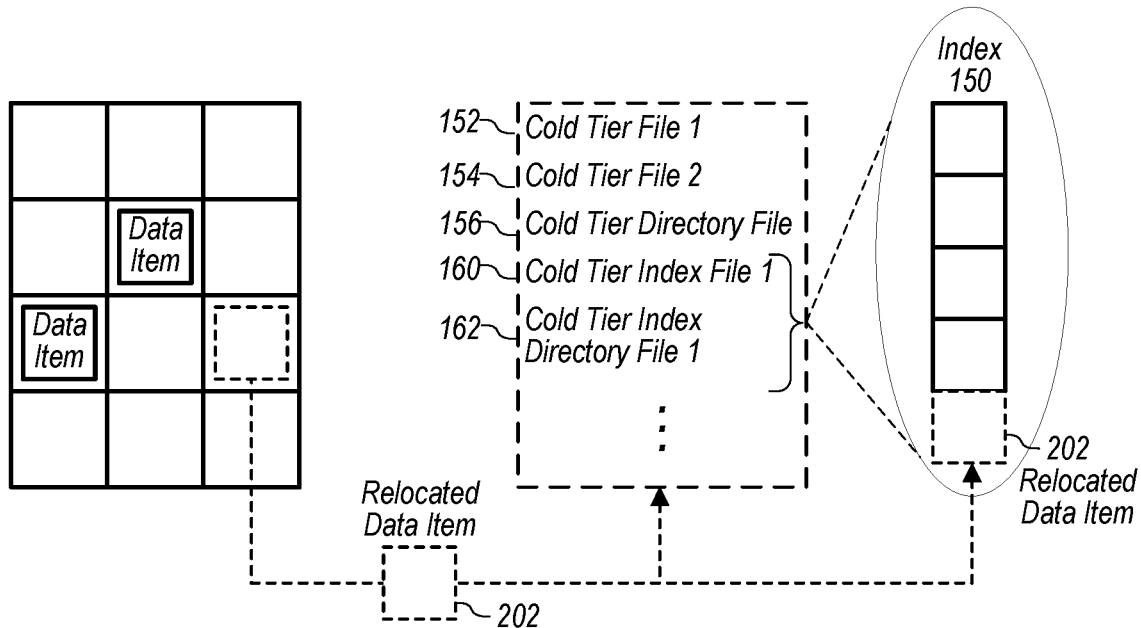
FIG. 2A illustrates a data item being relocated from the warm tier to the cold tier and a cold tier index being automatically updated to include the relocated data item, according to some embodiments.

Example Relocation or Superseding of Data Items and Updating of a Cold Tier Index FIG. 2A illustrates a data item being relocated from the warm tier to the cold tier and a cold tier index being automatically updated to include the relocated data item, according to some embodiments.

In some embodiments, a cold tier index may comprise a cold tier index flat file, such as cold tier index file 160, and a cold tier index directory file, such as cold tier index directory file 162. In some embodiments, a cold tier index flat file may be a similar type of file as a flat file used to store cold tier data, such as one of flat files 152 or 154. Also, a cold tier index directory file may store key-values or other identifiers of data items stored in a cold tier index file. The cold tier index directory file may also store information indicating where data for the data items included in the cold tier index are stored in the cold tier index flat file(s). In some embodiments, to update a cold tier index a data item may be added to a cold tier index file, such as cold tier index file 162, and a reference for the data item may be added to a cold tier index directory file, such as cold tier index directory file 162. In some embodiments, to update a cold tier index, a cold tier index directory file may be replaced with a new cold tier index directory file that includes a data item being added to the cold tier index.

For example, data for data item 202 may be added to cold tier file 150 and may also be added to cold tier index file 160. Additionally, cold tier directory file 156 and cold tier index directory file 162 may be replaced with a respective cold tier directory file and a respective cold tier index directory file including a reference for relocated data item 202 and information indicating where relocated data item 202 is stored in cold tier file 152 and cold tier index file 160, respectively. In some embodiments, cold tier index directory file 162 and cold tier directory file 156 may be organized according to a different criteria. For example, cold tier index directory file 162 may include identifiers for data items in cold tier index file 160 that are organized in ascending item-values, metadata values, key-values, etc. In contrast, the data items included in cold tier directory file 156 may be organized in ascending key-values, as an example. Also cold tier index directory file 162 may include only a sub-set of the entries that are included in cold tier directory file 156. Thus, cold tier index directory file 162 may be used to perform faster searches for particular types of data items than can be performed using cold tier directory file 156.

Figure 2B:
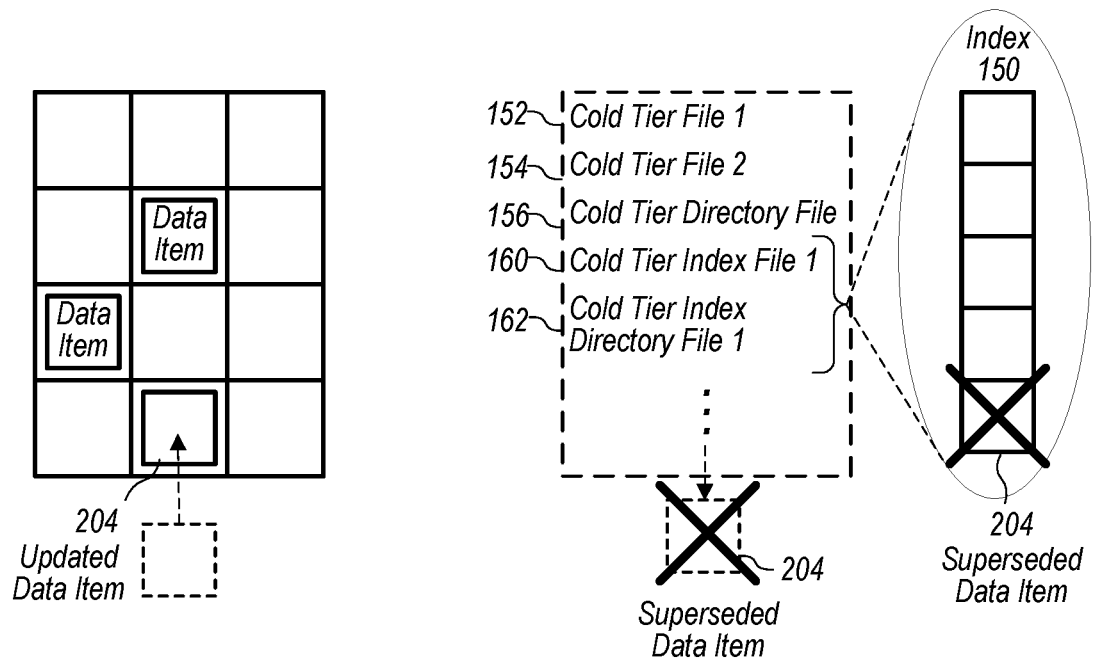
FIG. 2B illustrates a data item being updated at the warm tier such that a version of the data item included in the cold tier is superseded and removed from the cold tier and a cold tier index being automatically updated to remove the superseded data item, according to some embodiments.

FIG. 2B illustrates a data item being updated at the warm tier such that a version of the data item included in the cold tier is superseded and removed from the cold tier and a cold tier index being automatically updated to remove the superseded data item, according to some embodiments.

In response to a data item being promoted from the cold tier to the warm tier (and therefore no longer being authoritatively stored in the cold tier) or otherwise being updated at the warm tier such that a cold tier version of the data item is superseded, a configuration manager may update a cold tier directory file and cold tier index directory file to no longer include a reference for the superseded data item. However, data for the superseded data item may remain stored in a cold tier file and a cold tier index file until a clean-up operation is performed, in some embodiments. For example, a cold tier version of data item 204 may be superseded by an update to the data item 204 at the warm tier. Cold tier directory file 156 may be updated (or replaced) such that the cold tier directory file 156 no longer includes an entry for data item 204. In a similar manner cold tier index directory file 162 may be updated (or replaced) such that the cold tier index directory file no longer includes an entry for data item 204. However, because cold tier storage is relatively inexpensive as compared to warm tier storage, data for a data item, such as data item 204, may not be immediately removed from cold tier file 152 or cold tier file 154. Also data for data item 204 may not be immediately removed from cold tier index file 160. However, a clean-up operation may be subsequently performed to remove data for one or more data items from a cold tier file or a cold tier index file that no longer authoritatively store the data item in the cold tier.

Example Data Store Configuration

Figure 3:
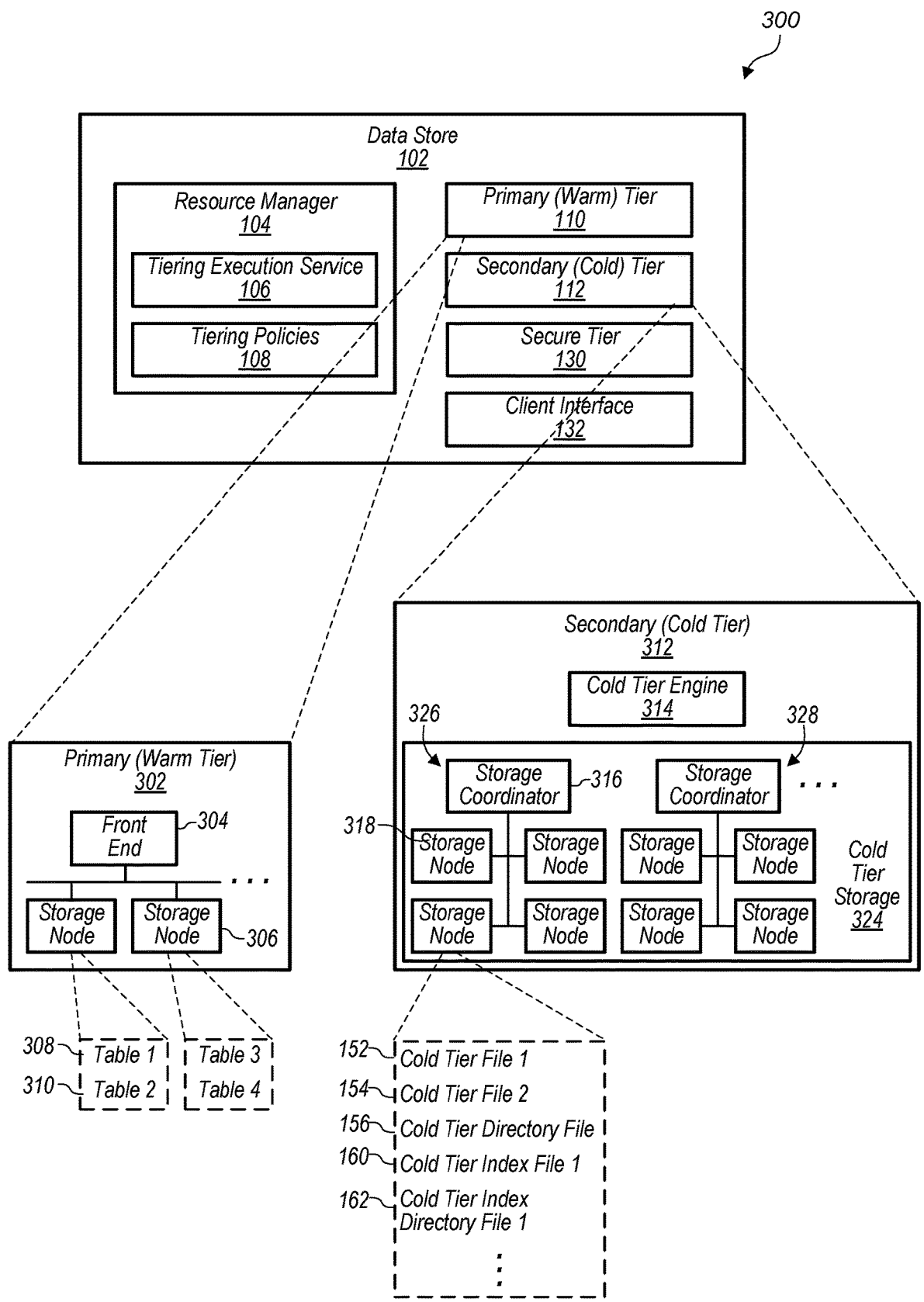
FIG. 3 illustrates further aspects of a warm tier and a cold tier of a data store, according to some embodiments.

FIG. 3 illustrates further aspects of a warm tier and a cold tier of a data store, according to some embodiments.

FIG. 3 illustrates a detailed view of an example warm tier 302 that illustrates at least one possible configuration for warm tier 110 according to at least some embodiments. It is noted that where one or more instances of a given component may exist, reference to that component herein below may be made in either the singular or the plural. However, usage of either form is not intended to preclude the other. In various embodiments, the components illustrated in warm tier 302 may be implemented directly within computer hardware, as instructions directly or indirectly executable by computer hardware (e.g., a microprocessor or computer system), or using a combination of these techniques. For example, the components of warm tier 302 may be implemented by a distributed system including a number of computing nodes (or simply, nodes), such as the computer node embodiment illustrated in FIG. 11 and discussed below. In various embodiments, the functionality of a given storage service system component of a warm tier may be implemented by a particular computing node or may be distributed across several computing nodes. In some embodiments, a given computing node may implement the functionality of more than one storage service system component of a warm tier.

Generally speaking, storage service clients may encompass any type of client configurable to submit web services requests to warm tier 302 via a network. For example, a given storage service client may include a suitable version of a web browser, or a plugin module or other type of code module configured to execute as an extension to or within an execution environment provided by a web browser to provide storage service clients (e.g., client applications, users, and/or subscribers) access to the data storage services provided by warm tier 302. Alternatively, a storage service client may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, a storage service client may be an application configured to interact directly with data store 102. In various embodiments, storage service client may be configured to generate web services requests according to a Representational State Transfer (REST)-style web services architecture, a document- or message-based web services architecture, or another suitable web services architecture.

Generally speaking, data store 102 may be configured to implement one or more service endpoints configured to receive and process web services requests, such as requests to access tables maintained on behalf of clients/users by a data storage service, and/or the items and attributes stored in those tables. For example, data store 102 may include hardware and/or software configured to implement various service endpoints and to properly receive and process HTTP-based web services requests directed to those endpoints. In one embodiment, warm tier 302 may be implemented as a server system configured to receive web services requests from clients via client interface 132 and to forward them to various components that collectively implement a data storage system for processing. In other embodiments, warm tier 302 may be configured as a number of distinct systems (e.g., in a cluster topology) implementing load balancing and other request management features configured to dynamically manage large-scale web services request processing loads.

As illustrated in FIG. 3, warm tier 302 may include a front end 304 (which may be configured to receive, authenticate, parse, throttle and/or dispatch service requests, among other things), one or more administrative components, or auto admin instances (not shown), (which may be configured to provide a variety of visibility and/or control functions), and a plurality of storage node instances (shown as storage nodes 306), each of which may maintain and manage one or more tables on behalf of clients/users or on behalf of the data storage service (and its underlying system) itself.

In addition to functioning as an addressable endpoint for clients' web services requests, in some embodiments, warm tier 302 may implement various client management features. For example, warm tier 302 may coordinate the metering and accounting of client usage of web services, including storage resources, such as by tracking the identities of requesting clients, the number and/or frequency of client requests, the size of tables and/or items stored or retrieved on behalf of clients, overall storage bandwidth used by clients, class of storage requested by clients, and/or any other measurable client usage parameter.

FIG. 3 also illustrates a detailed view of an example hardware implementation of cold tier 312 that illustrates at least one possible configuration for cold tier 112 according to at least some embodiments.

In the illustrated embodiment shown in FIG. 3, cold tier 312 includes a cold tier engine 314 and a cold tier storage 324. The cold tier storage 324 is shown including two areas 326 and 328. Each of areas 326 and 328 includes a respective coordinator instance 316. Areas 326 and 328 may also include various combinations of storage nodes 318, wherein at least one of the storage nodes is a keymap instance.

In one embodiment each of areas 326 and 328 may be considered a locus of independent or weakly correlated failure. That is, the probability of any given area experiencing a failure may be generally independent from or uncorrelated with the probability of failure of any other given area, or the correlation of failure probability may be less than a threshold amount.

Areas 326 and 328 may include additional levels of hierarchy (not shown). Additionally, different cold tier components may communicate according to any suitable type of communication protocol. For example, where certain cold tier components are implemented as discrete applications or executable processes, they may communicate with one another using standard interprocess communication techniques that may be provided by an operating system or platform (e.g., remote procedure calls, queues, mailboxes, sockets, etc.), or by using standard or proprietary platform-independent communication protocols. Such protocols may include stateful or stateless protocols that may support arbitrary levels of handshaking/acknowledgement, error detection and correction, or other communication features as may be required or desired for the communicating cold tier components. For example, in one cold tier embodiment, a substantial degree of inter-component communication may be implemented using a suitable Internet transport layer protocol, such as a version of Transmission Control Protocol (TCP), User Datagram Protocol (UDP) or a similar standard or proprietary transport protocol. However, it is also contemplated that communications among cold tier components may be implemented using protocols at higher layers of protocol abstraction.

In some embodiments, data items stored in a cold tier, such as cold tier 312, may be structured as objects and stored in secure, durable, highly scalable object storage in storage locations referred to as "buckets." For example, in embodiments in which colt tier 312 is implemented using Amazon's S3 service, an S3 object may include data, a key, and metadata. The object key (or key name) may uniquely identify the key-addressable object in a bucket, and an index of such keys may also be maintained as a key map in at least one of the storage nodes 318.

In some embodiments, data items selected for tiering from client tables stored in a warm tier such as data items from tables 1, 2, 3, or 4, may be included in a cold tier file such as cold tier file 1 (152) and cold tier file 2 (154) stored in one of storage nodes 318 of cold tier 312. In some embodiments, a cold tier file may be a flat file without an internal hierarchy. Additionally, the data items satisfying one or more index criteria for a cold tier index, such as cold tier index one, may be stored in a cold tier index file, such as cold tier index file 1 (160). The flat file may also be a write once read many times file also referred to as a read only database (RODB) file. In some embodiments, a cold tier may further include a cold tier directory file, such as cold tier directory file 156. The cold tier directory file may include an ordered list of key-values for data items that have been relocated to the cold tier and associated mappings of storage locations in the cold tier files, e.g. cold tier file 1 or cold tier file 2, where the corresponding data items are stored.

Also a cold tier may further include a cold tier index directory file, such as cold tier directory index file 162, including key values for data items that have been relocated to the cold tier and that are included in the cold tier index. The cold tier index directory file may include associated mappings of storage locations in the cold tier index files, e.g. cold tier index file 160, where the corresponding data items are stored.

In some embodiments, a resource manager, such as resource manager 104, may store a data item that is to be relocated to a cold tier to a storage node in the cold tier storage and send a notification to a cold tier engine, such as cold tier engine 314, that the data item has been added to a cold tier storage of the cold tier. In response, the cold tier engine may add a key value and mapping for the data item to a cold tier directory file, such as cold tier directory file 322. In some embodiments, a cold tier engine may add the data item to an existing cold tier file, such as one of cold tier files 1 (332) or 2 (334), by reading the cold tier file into memory, appending the data item into the cold tier file and storing a new version of the cold tier file that includes the data item. A cold tier index file may be updated in a similar manner.

In some embodiments cold tier files and a cold tier directory file may be updated for a plurality of data items being added to the cold tier and a cold tier index file and cold tier index directory file may be subsequently updated, asynchronously. In other embodiments, a cold tier index and cold tier index directory file may be updated synchronously as the cold tier file and cold tier directory file are updated. For example, each data item updated in the cold tier file and cold tier directory file may also be updated in a cold tier index file and cold tier index directory file before a next data item is updated in the cold tier file and the cold tier directory file.

In some embodiments, tiers such as warm tier 110 and cold tier 112, of a data store, may be transparent to the client after submitting client specifications to select policies for the tiering service. For example, from a client's perspective table 1 (308) that includes at least some data items stored in warm tier 110 and at least some data items that have been relocated to cold tier 112 may appear to the client as a single unified data set and may not appear to the client as different data sets stored in different tiers of a data store.

Example Warm Tier Table Including Tombstones

Figure 4:
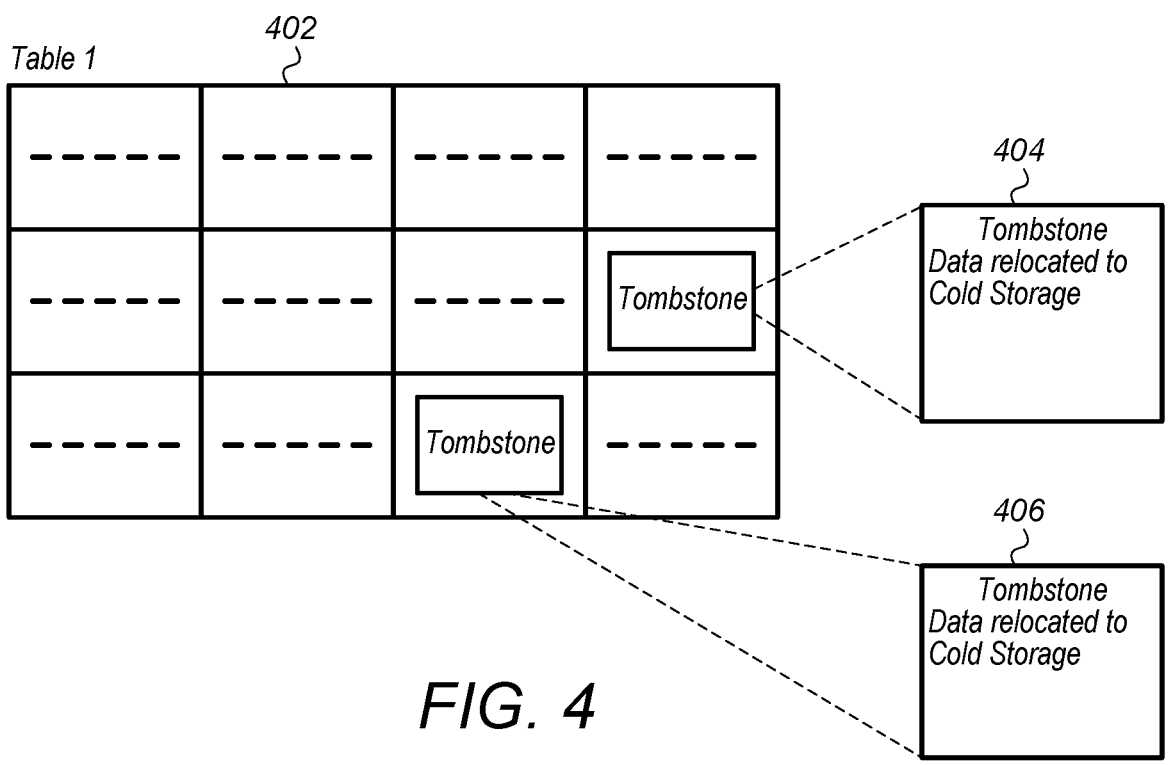
FIG. 4 illustrates a warm tier table that includes tombstones for data items that have been relocated from the warm tier to a cold tier, according to some embodiments.

FIG. 4 illustrates a warm tier table that includes tombstones for data items that have been relocated from the warm tier to a cold tier, according to some embodiments.

Table 1 (402) may be the same as table 120 described in FIG. 1 or any of the tables described in FIG. 2. In some embodiments, in accordance with a client specified tiering policy and client specified tombstone forwarding policy, one or more data items included in a table or scope stored in a warm tier of a data store may be relocated to a cold tier and replaced in the warm tier with a tombstone. For example tombstone 404 and tombstone 406 represent data items that have been relocated to a cold tier. In some embodiments, a client specified tombstone forwarding policy may specify that detailed address information for a relocated data item is to be included in a tombstone for the relocated data item. In some embodiments, a tombstone forwarding policy may require that location information included in the tombstone indicates that the data item has been relocated to a cold tier, but may not require that the location information include a particular address within the cold tier at which the relocated data item is stored.

Illustrative Cold Tier Indexes

FIG. 5A-E are examples of cold tier indexes that may be generated, according to some embodiments.

Figure 5:
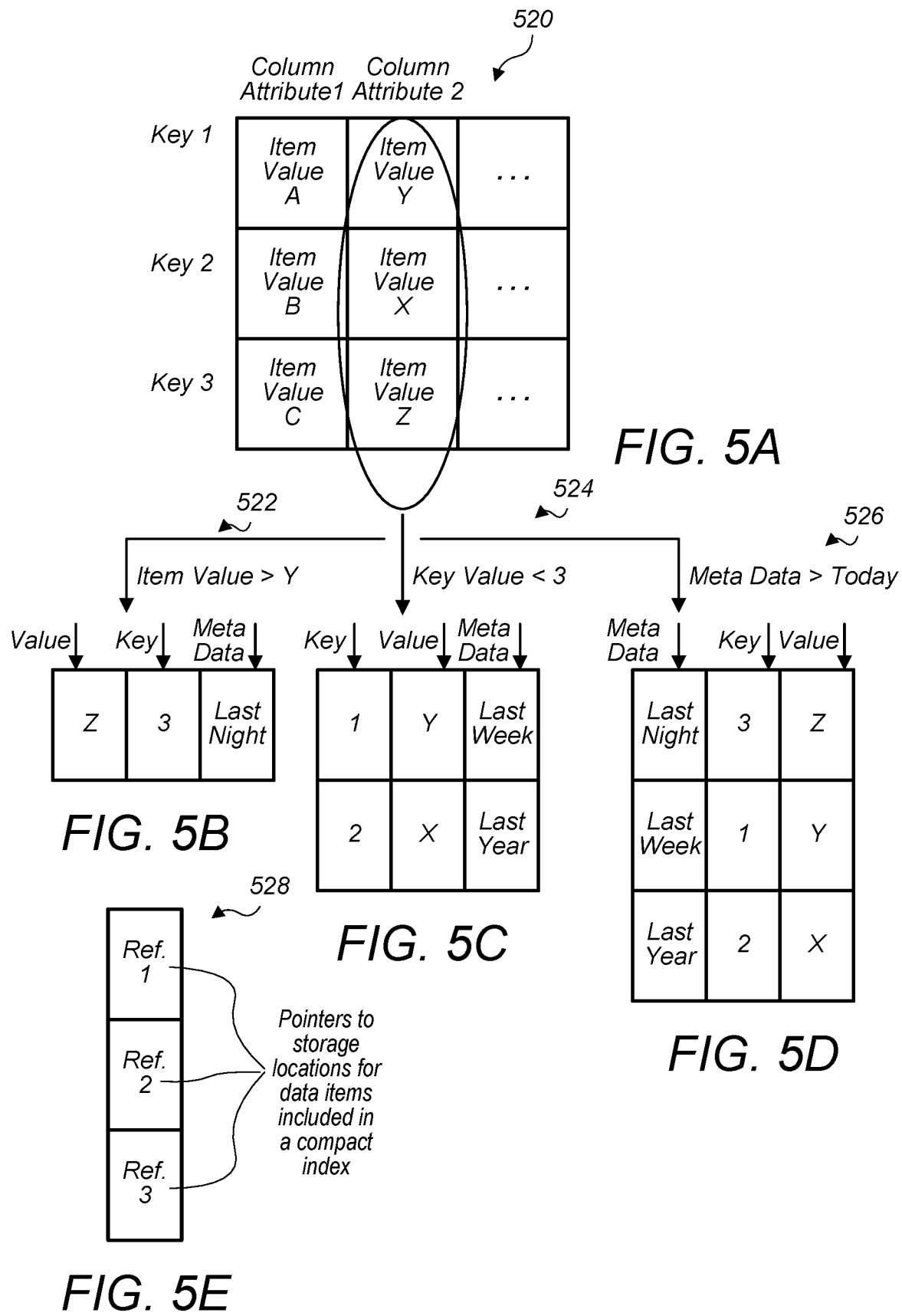
FIG. 5A-E are examples of cold tier indexes that may be generated, according to some embodiments

FIG. 5A illustrates a table 520 that may be stored in a warm tier NoSQL database, such as table 120 illustrated in FIG. 1 or any of the tables illustrated in FIG. 2. Each row of table 520 has a unique key-value. For example the first three rows of table 520 have key-values, 1, 2, and 3. Also each column of table 520 has an associated column attribute. For example, each row of table 520 may be a state of the United States and each column may be associated with an attribute of that state, such as land area, population, etc. Table 520 also includes item values A, B, C, X, Y, and Z. In some embodiments, each entry in table 520 may be a data item defined by a key-value and item-value pair. For example, a key-value may correspond with a state and an item-value may correspond with a value for a column attribute for that key-value such as a population of the state for a column with the column attribute "population." Each data item may also include one or more associated pieces of meta-data, such as a last time the data item was modified, for example.

In some embodiments, a client may specify one or more index criteria for an index that is to be generated based on a table, such as table 520. For example, a client may specify a table name, selected column attribute, an index organization criteria, an index comparator, a comparison value, an index limit, or an indication regarding whether the index is to be compact. In some embodiments, these index criteria may be specified via a create cold tier index API or may be modified via a modify cold tier index API.

FIG. 5B illustrates an example index 522, wherein column attribute 2 of table 520 is selected as an index criteria for index 522. Furthermore, an index organization criteria for index 522 is selected as "item values" and a comparator is selected as ">". Furthermore a comparison value is selected as "Y." Thus data items with item values greater than "Y" are to be included in index 522. Thus the data item with key-value pair (key=3, value=Z) is selected to be included in index 522 because the data item satisfies the index criteria specified for index 522. Because index 522 is an "item-value" index, the data items included in index 522 are organized by "item-values." Also, in some embodiments, key-values and meta-data values are projected on to the index. In some embodiments other columns having other column attributes may also be projected onto index 522.

FIG. 5C illustrates a similar example index, index 524. However, in this index an index organization criteria for index 524 is selected as "key values" and a comparator is selected as "<". Furthermore a comparison value is selected as "3." Thus data items with key values less than "3" are to be included in index 524. Based on these index criteria the data item with key-value pair (key=1, value=Y) and the data item with key-value pair (key=2, value=X) are selected to be included in index 524 because these data items satisfy the index criteria specified for index 524. Because index 522 is a "key-value" index, the data items included in index 524 are organized by "key-values." Also item-values and meta-data values are projected on to the index. In some embodiments other columns having other column attributes may also be projected onto index 524.

FIG. 5D illustrates yet another example index, index 526. In this index an index organization criteria for index 526 is selected as "meta-data values" and a comparator is selected as ">". Furthermore a comparison value is selected as "Today." Thus data items with meta-data values greater than "Today" are to be included in index 526. For example, data values indicating more elapsed time than other meta-data values may have greater values. Based on these index criteria the data item with key-value pair (key=1, value=Y), the data item with key-value pair (key=1, value=Y), and the data item with key-value pair (key=2, value=X) are selected to be included in index 524 because these data items satisfy the index criteria specified for index 526. Because index 522 is a "meta-data-value" index, the data items included in index 526 are organized by "meta-data-values." Also item-values and key values are projected on to the index. In some embodiments other columns having other column attributes may also be projected onto index 526.

FIG. 5D illustrates an example compact cold tier index according to some embodiments. For example, compact index 528 may be a compact version of index 526. In other words, compact index 526 may include the same data items organized in the same order as in index 526. However, instead of including "key-values", "item-values" and "meta-data values" for each of the data items included in index 528, the index may instead simply include a reference to the data items, wherein the "key-values", "item-values" and "meta-data values" for the data items are stored in a cold tier file. For example a cold tier index that is a compact index may include a cold tier index directory file that references storage locations for data items in cold tier files (as opposed to a cold tier index file). Thus a compact cold tier index may not include a cold tier index file that comprises data items included in the cold tier index that each include "key-values", "item-values" and "meta-data values". In some embodiments, a compact cold tier index, such as compact cold tier index 528 may include key-value entries for data items included in the compact cold tier index and "item-values" and "meta-data values" may be determined by looking up the "key-value" in a cold tier directory to determine storage locations of the data items in one or more cold tier files.

Example Method of Creating and Updating a Cold Tier Index

Figure 6:
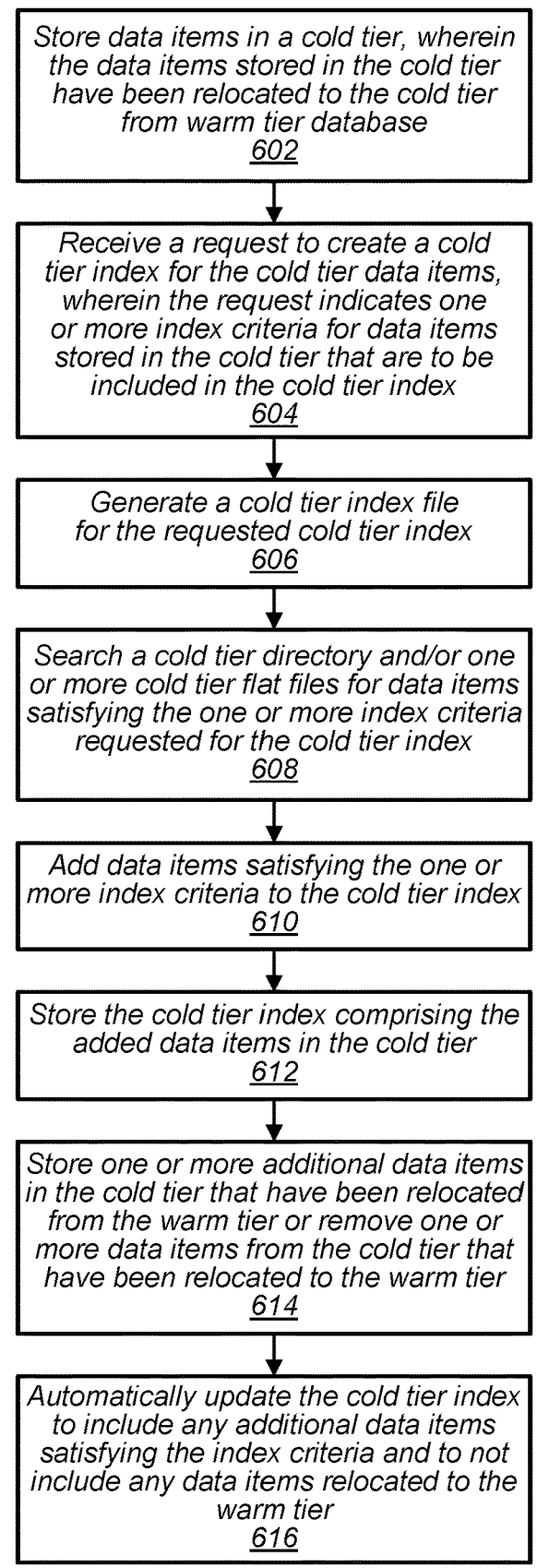
FIG. 6 is a flowchart illustrating a method for configuring and updating a cold tier index, according to some embodiments.

FIG. 6 is a flowchart illustrating a method for configuring and updating a cold tier index, according to some embodiments.

At 602, data items are stored in a cold tier of a data store. The data items are data items that have been relocated from a warm tier, for example, in response to one or more tierring criteria being met.

At 604, a request to create a cold tier index is received. The request indicates index criteria for creating the cold tier index. For example, the request may specify any of the parameters described in regard to the create cold tier index API.

At 606, a cold tier index file is generated. The cold tier index file may be a flat file stored in the cold tier.

At 608, data items stored in the cold tier may be searched to located data items stored in the cold tier that satisfy the index criteria for the cold tier index that is to be created.

At 610, data items satisfying the index criteria are added to the cold tier index file generated at 606.

At 612, the cold tier index is stored in the cold tier. In some embodiments, a cold tier index directory may further be generated for the data items added to the cold tier index file at 610.

At 614, one or more additional data items are added to the cold tier. For example, the data items may be data items that are being relocated from the warm tier to the cold tier.

At 616, the cold tier index is automatically updated to include any of the additional data items added to the cold tier that also satisfy the index criteria for the cold tier index. In the case of data items, that have been promoted from the cold tier to the warm tier, the cold tier index may also be updated to not include data items that are no longer authoritatively stored in the cold tier.

Example Method of Determining Index Criteria for a Cold Tier Index

Figure 7:
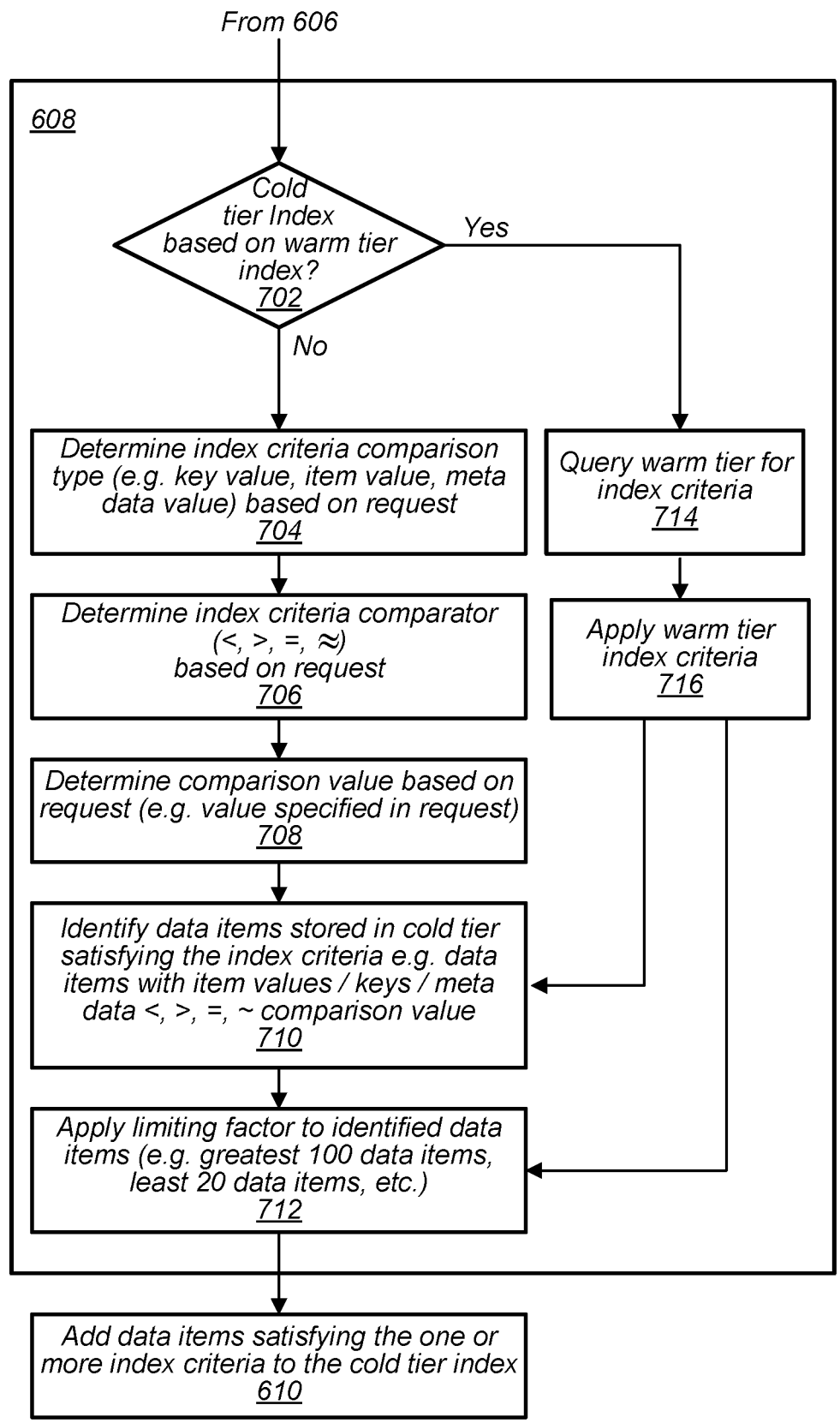
FIG. 7 is a flowchart illustrating further details for searching a cold tier for data items to be included in a cold tier index, according to some embodiments.

FIG. 7 is a flowchart illustrating further details for searching a cold tier for data items to be included in a cold tier index, according to some embodiments. The elements shown in FIG. 7 may be steps taken as part of searching for data items to include in a cold tier index as described at 608.

At 702, it is determined if the index criteria to be used to search for data items to include in the cold tier index are to be based on index criteria of an existing warm tier index. If so, at 714 the warm tier index is queried to determine the index criteria of the warm tier index and at 716, the index criteria of the warm tier index are applied at 710, which is discussed in more detail below. In some embodiments, a warm tier index may be initially queried to determine index criteria for a cold tier index, wherein the cold tier index is subsequently de-coupled from the warm tier index. Also, in some embodiments a warm tier index may be queried for updates to the index criteria of the warm tier index. In such embodiments, cold tier index criteria that are based on the index criteria for the warm tier index may be updated such that the index criteria for the warm tier index and the index criteria for the cold tier index are synchronized.

If at 702, it is determined that the cold tier index is not to inherit index criteria of an existing warm tier index, one or more parameters received via a create cold tier index API are examined to determine index criteria for the cold tier index that is to be created.

For example, an index criteria comparison type is determined at 704. For example, are data items to be included in the cold tier index to be evaluated based on "key-values", "item-values", or "meta-data values' as an example.

At 706, it is determined what type of comparator is to be used to evaluate item values to be included in the requested cold tier index. For example are data items with a corresponding value (e.g. key-value, item-value, or meta-data value) to be selected if the value is greater than, less than, equal to, or similar to a given comparison value. For example, a comparison value is determined at 708 that may be compared to values of data items using the determined index criteria comparator. As an example, an index criteria comparison may be determined to be "item-values" an index criteria comparator may be determined to be "equals" and a comparison value may be determined to be "10." Thus all data items with item values equal to "10' may be included in the cold tier index.

At 710, data items satisfying the index criteria are determined. In some embodiments, a limiting factor may further be specified via a create cold tier index API. At 712, the limiting factor may be applied. For example, a limiting factor may indicate that only a certain number of results are to be included in the cold tier index. Also, at 710 index criteria inherited from a warm tier index may be applied to identify data items satisfying the index criteria inherited from the warm tier and the results may be limited at 712. The data items from 721 may then be added to a cold tier index at 610 as described above.

Figure 8:
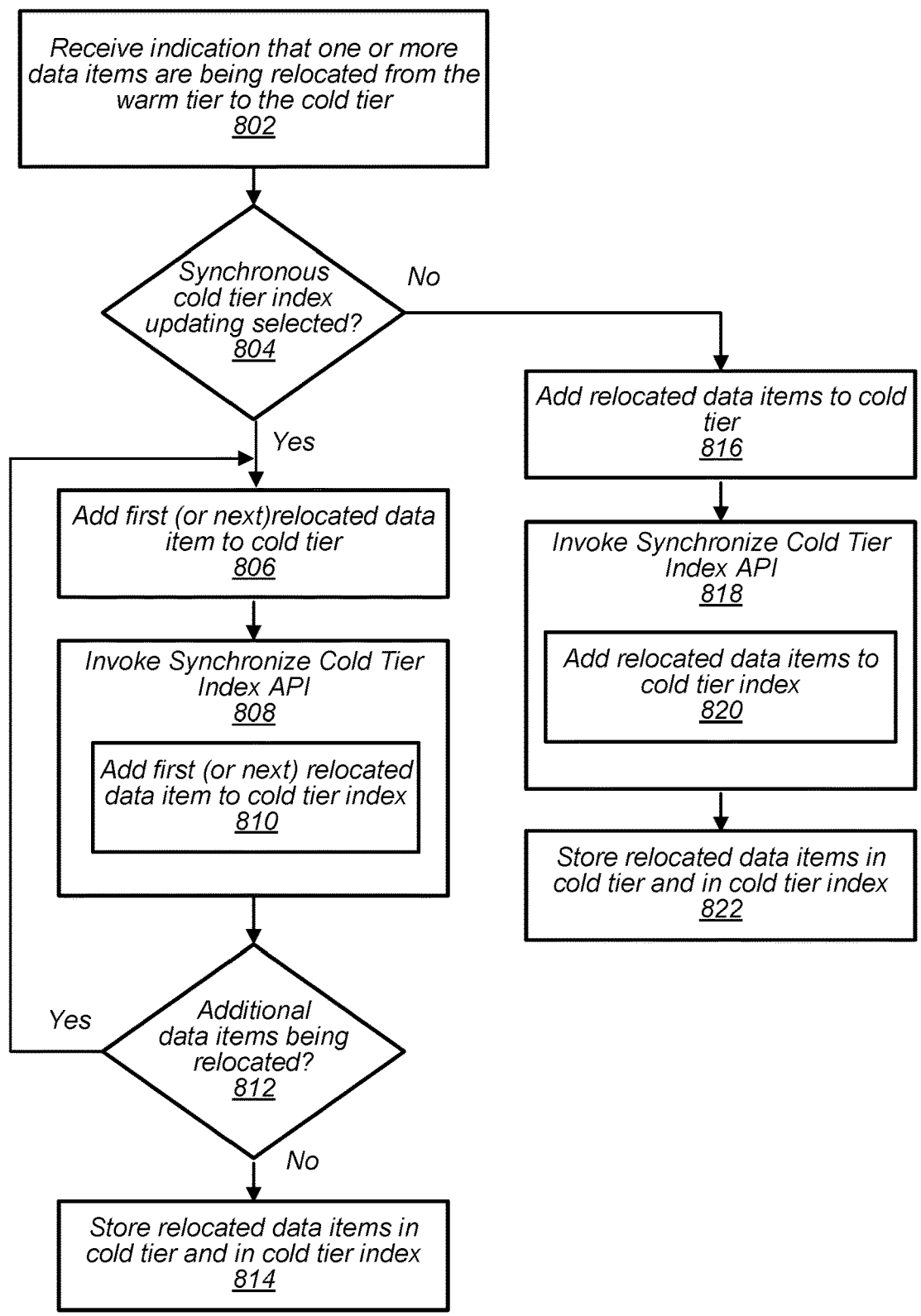
FIG. 8 is a flowchart illustrating further details for updating a cold tier index when additional data items are relocated to the cold tier, according to some embodiments.

Example Method of Updating a Cold Tier Index for Data Items Added to a Cold Tier FIG. 8 is a flowchart illustrating further details for updating a cold tier index when additional data items are relocated to the cold tier, according to some embodiments.

At 802, an indication may be received that one or more data items are being relocated from a warm tier to a cold tier. For example, a resource manager may indicate to a configuration manager that one or more data items are being relocated from a warm tier to a cold tier. At 804, it may be determined if a client of the data store has selected synchronous cold tier index updating or asynchronous cold tier index updating.

If synchronous cold tier index updating has been selected, at 806 a first (or next) data item may be relocated to the cold tier. At 808, a synchronize cold tier index API may be invoked, for example by the resource manager or the configuration manager. Invoking the synchronize cold tier index API may cause, at 810, a first (or next) data item relocated to the cold tier that also satisfies the index criteria for the cold tier index to be added to the cold tier index. At 812, it is determined if another data item is to be relocated from the warm tier to the cold tier. If so, 806-810 may be repeated for each additional data item being added to the cold tier. If there are not additional data items being added to the cold tier, at 814, the relocated data items may be stored in the cold tier and in the cold tier index of the cold tier.

If asynchronous cold tier updating has been selected, it may be determined at 804, that the cold tier index is not to be synchronously updated. In response, at 816, the data items being relocated from the warm tier to the cold tier may be added to the cold tier. Subsequently, at 818, a synchronize cold tier index API may be invoked to update a cold tier index. This may cause, at 820, data items satisfying the index criteria for the cold tier index to be added to the cold tier index. In some embodiments, a changes file may be maintained to record data items added to the cold tier at 816 and the data items included in the changes file may be evaluated to determine if the data items satisfy the index criteria for the cold tier index. If any of the data items indicated in the changes file satisfy the index criteria for the cold tier index, the data items are added to the cold tier index. This may take place after the data items have already been added to a cold tier file and a cold tier directory file.

At 822, the relocated data items may be stored in the cold tier and in the cold tier index of the cold tier.

Figure 9:
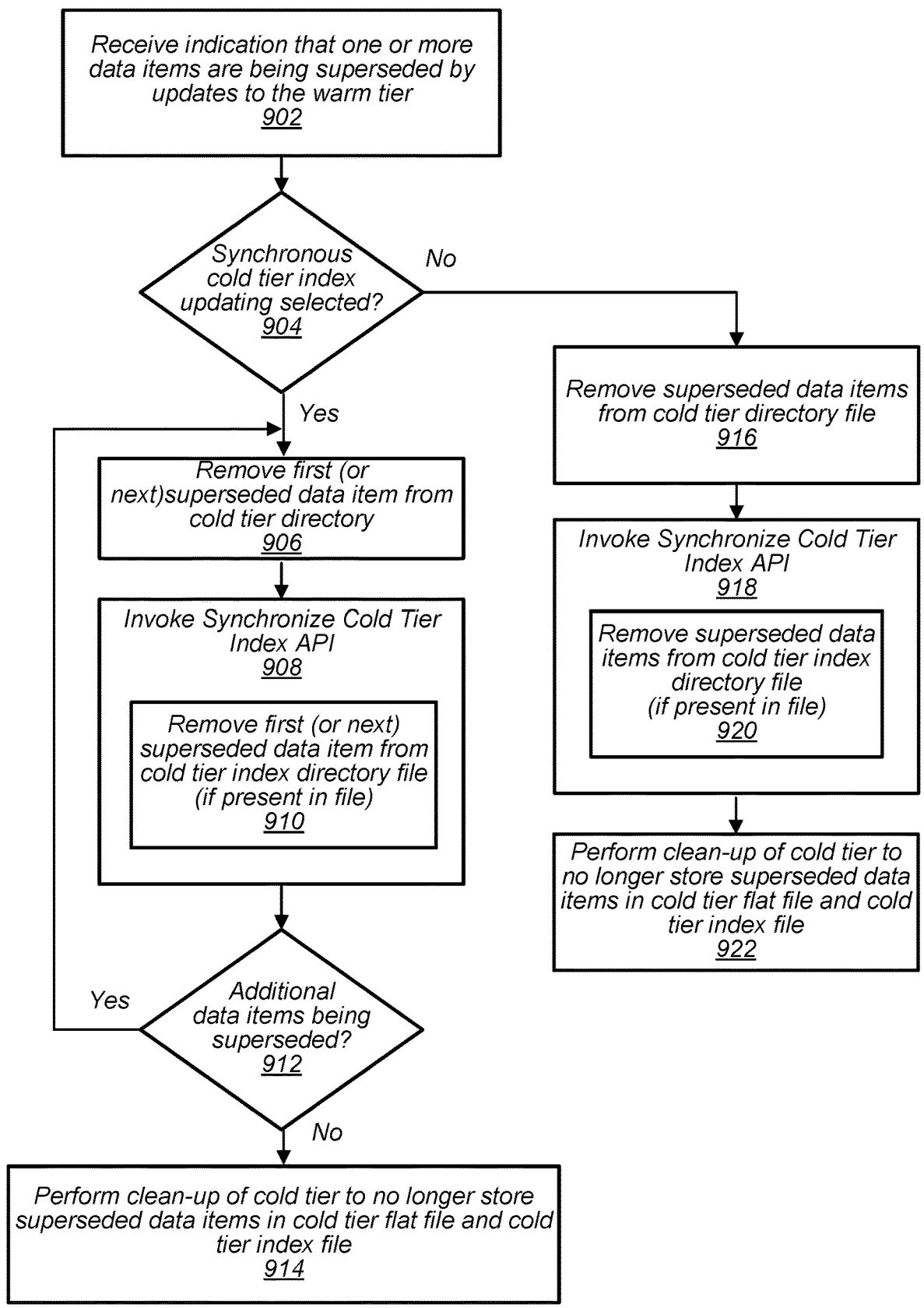
FIG. 9 is a flowchart illustrating further details for updating a cold tier index when data items stored in the cold tier are superseded or removed, according to some embodiments.

Example Method of Updating a Cold Tier Index for Data Items Removed from a Cold Tier FIG. 9 is a flowchart illustrating further details for updating a cold tier index when data items stored in the cold tier are superseded or removed, according to some embodiments.

At 902, an indication may be received that one or more data items are being relocated from a cold tier to a warm tier, e.g. the data items are being promoted to the warm tier, or that one or more data items stored in the cold tier are being superseded by an update being performed at the warm tier or are otherwise being removed from the cold tier. For example, a resource manager may indicate to a configuration manager that one or more data items are to be relocated from the cold tier to a warm tier or that a newer version of a data item is being stored at the warm tier, thus superseding a version of the data item stored in the cold tier. Also, an indication may be received that one or more data items stored in the cold tier have been deleted.

At 904, it may be determined if a client of the data store has selected synchronous cold tier index updating or asynchronous cold tier index updating.

If synchronous cold tier index updating has been selected, at 906 a first (or next) data item may be relocated to the warm tier or updated thus superseding a cold tier version of the first (or next) data item. At 908, a synchronize cold tier index API may be invoked, for example by the resource manager or the configuration manager. Invoking the synchronize cold tier index API may cause, at 910, a first (or next) superseded or deleted data item to be removed from the cold tier index or a cold tier index directory file. At 912, it is determined if another data item in the cold tier has been superseded or deleted. If so, 906-910 may be repeated for each additional data item being superseded or deleted. If there are not additional data items being superseded or deleted, at 914, the remaining data items may be stored in the cold tier and in the cold tier index of the cold tier. Also a clean-up operation may be performed to remove superseded or deleted data items remaining stored in a cold tier file or a cold tier index file that have been removed from the cold tier. For example, in some embodiments, when a data item is removed from the cold tier, a cold directory file and/or a cold tier index directory file may be updated to no longer include the data item. However the data item may be allowed to remain in a cold tier file and/or a cold tier index file until a cleanup operation is performed to remove the data item from the cold tier file or the cold tier index file.

If asynchronous cold tier updating has been selected, it may be determined at 904, that the cold tier index is not to be synchronously updated. In response, at 916, the superseded or deleted data items may be removed from the cold tier. For example the data items may be removed from a cold tier directory file. Subsequently, at 918, a synchronize cold tier index API may be invoked to update a cold tier index. This may cause, at 920, data items to be removed from a cold tier index. In a similar manner, the data items may be removed from a cold tier index directory but may be allowed to remain in a cold tier index file until a clean-up operation is performed. In some embodiments, a changes file may be maintained to record data items removed from the cold tier at 916 and the data items included in the changes file may be removed from the cold tier index. This may take place after the data items have already been removed from a cold tier file and a cold tier directory file.

At 922, a clean-up operation may be performed to remove any data for data items remaining stored in a cold tier file or cold tier index file.

Searching Cold Tier Data Items Using Cold Tier Indexes

Figure 10:
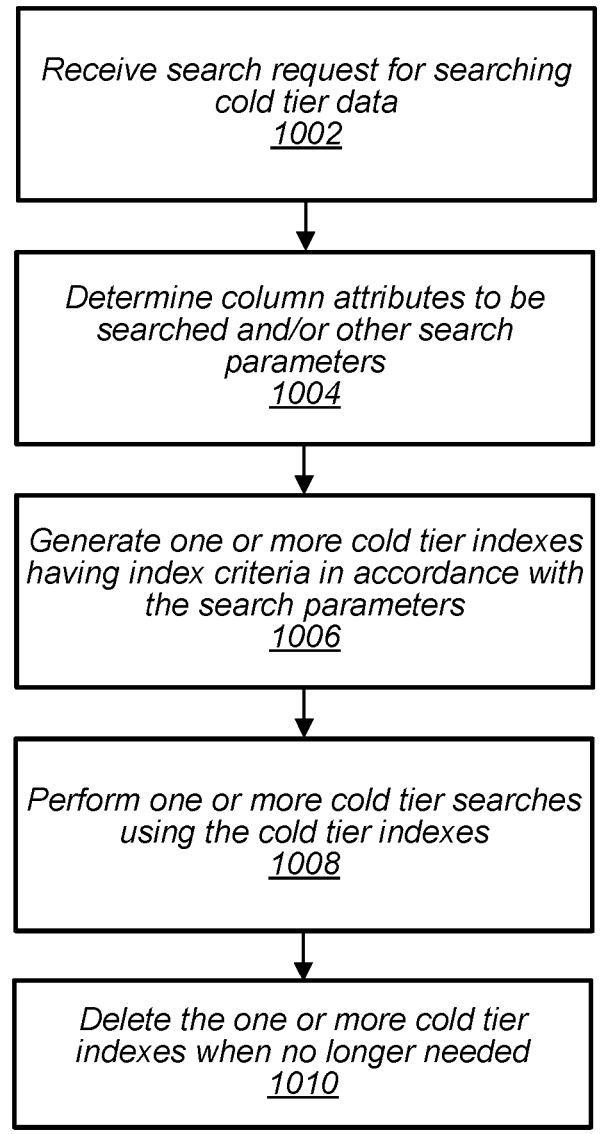
FIG. 10 is a flowchart illustrating a method for searching cold tier data using indexes, according to some embodiments.

FIG. 10 is a flowchart illustrating a method for searching cold tier data using indexes, according to some embodiments.

At 1002, a search request to search cold tier data is received. For example a client of a business analytics application may submit a search request to a client interface, such as client interface 132. The request may invoke a cold tier search API, such as cold tier search API 170.

At 1004, column attributes to be searched are determined based, at least in part, on the search request. Also other search parameters are determined. For example, if the search is seeking key values, item values, or meta-data values such search parameters may be determined based on the request and may be used in selecting index criteria for indexes to be generated to perform the search. For example, at 1006 one or more cold tier indexes are generated having index criteria in accordance with search parameters included in the search request.

At 1008, one or more cold tier searches are performed using the cold tier indexes to improve the searches. For example, data items sought by a search may be located more quickly in the cold tier using a cold tier index that is organized in a particular manner that corresponds with a search parameter of a cold tier search.

At 1010, the one or more cold tier indexes are automatically deleted. For example, after a search or set of searches is complete, a configuration manager, such as configuration manager 136, may invoke a delete index API, such as delete index API 146. Also, in some embodiments, a client may direct deletion of one or more cold tier indexes. In some embodiments, cold tier indexes that are not used within a certain amount of time may be automatically deleted. In some embodiments, cold tier indexes may be automatically deleted in response to other triggering events.

In some embodiments, cold tier indexes of a cold tier may further support index aggregation. For example, in some embodiments an index may include entries that "aggregate" the other entries included in the index. For example an index may include an entry for max value, minimum value, mean value, median value, etc. In such embodiments, a search function may determine aggregate characteristics of a cold tier index and use the aggregate characteristics to improve a search. For example, a search may seek a particular value in an index and may initially determine a mean value for the entries in the index, wherein the mean value is then used as a starting point for searching the index for the particular value.

Illustrative Computer System

Figure 11:
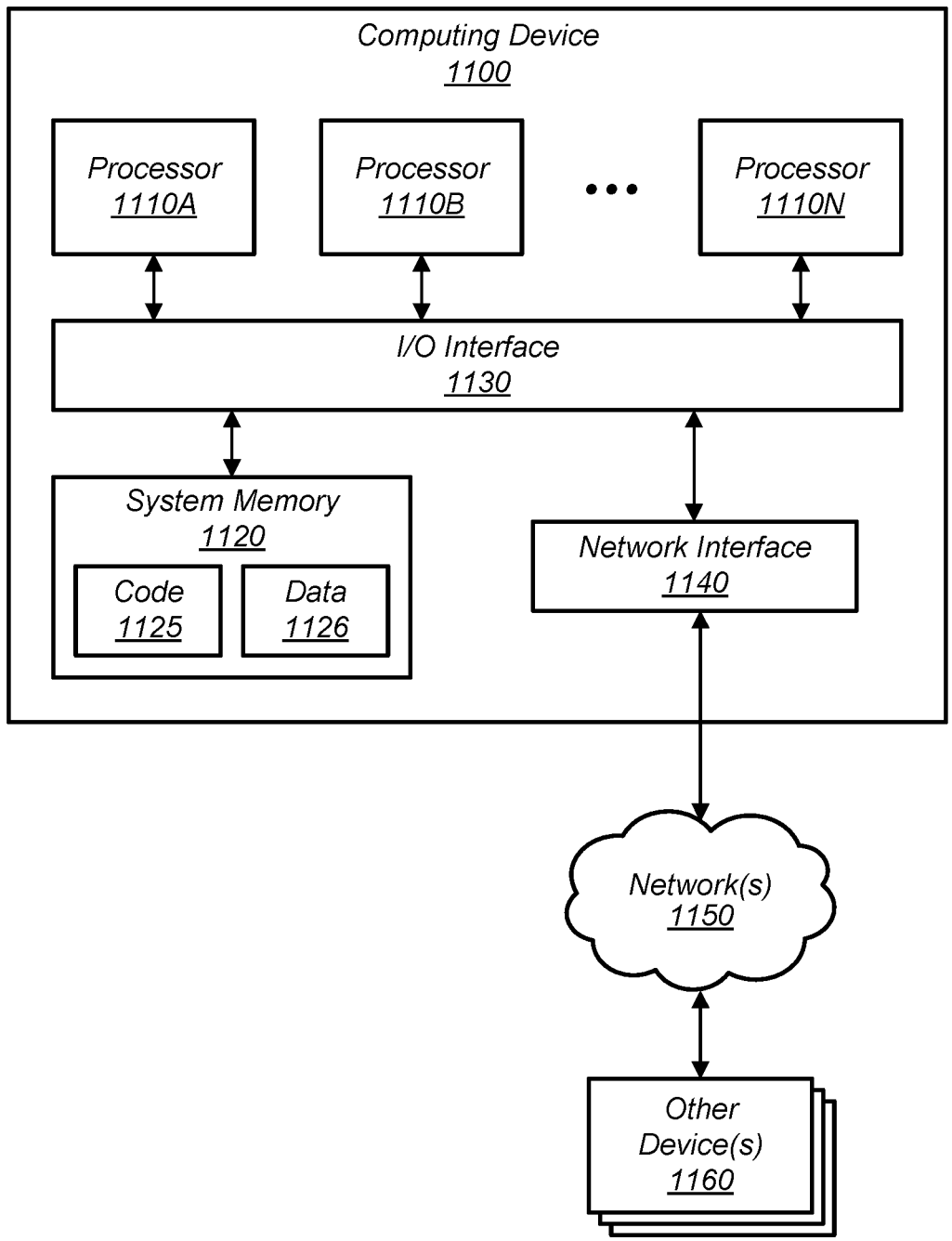
FIG. 11 illustrates an example computing device that may be used in some embodiments.

In at least some embodiments, a computer system that implements a portion or all of one or more of the technologies described herein may include a computer system that includes or is configured to access one or more computer-readable media. FIG. 11 illustrates such a computing device 1100. In the illustrated embodiment, computing device 1100 includes one or more processors 1110A-1110N coupled to a system memory 1120 via an input/output (I/O) interface 1130. Computing device 1100 further includes a network interface 1140 coupled to I/O interface 1130.

In various embodiments, computing device 1100 may be a uniprocessor system including one processor or a multiprocessor system including several processors 1110A-1110N (e.g., two, four, eight, or another suitable number). Processors 1110A-1110N may include any suitable processors capable of executing instructions. For example, in various embodiments, processors 1110A-1110N may be processors implementing any of a variety of instruction set architectures (ISAs), such as the x86, PowerPC, SPARC, or MIPS ISAs, or any other suitable ISA. In multiprocessor systems, each of processors 1110A-1110N may commonly, but not necessarily, implement the same ISA.

System memory 1120 may be configured to store program instructions and data accessible by processor(s) 1110A-1110N. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1120 as code (i.e., program instructions) 1125 and data 1126.

In one embodiment, I/O interface 1130 may be configured to coordinate I/O traffic between processors 1110A-1110N, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processors 1110A-1110N.

Network interface 1140 may be configured to allow data to be exchanged between computing device 1100 and other devices 1160 attached to a network or networks 1150. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1100 via I/O interface 1130. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 1100 as system memory 1120 or another type of memory. Further, a computer-readable medium may include transmission media or signals such as electrical, electromagnetic, or digital signals, conveyed via a communication medium such as a network and/or a wireless link, such as may be implemented via network interface 1140. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system comprising:
   a data store comprising a warm tier and a cold tier, wherein the warm tier has a lower latency for data access than the cold tier, and wherein the cold tier comprises:
   one or more flat files, wherein at least one of the one or more flat files comprises a respective plurality of data items relocated from the warm tier to the cold tier; and
   one or more cold tier directory files comprising identifiers for the relocated data items and respective storage locations in the one or more flat files where the relocated data items are stored; and
   one or more computing devices implementing a configuration manager configured to:
   receive, via a create cold tier index application program interface (API), a request to create a cold tier index for the cold tier, wherein the request indicates one or more index criteria for data items relocated from the warm tier and stored in the cold tier that are to be included in the cold tier index, wherein the one or more index criteria specify one or more attributes or metadata for the data items other than the identifiers for the relocated data items in the one or more cold tier directory files;
   search the one or more flat files of the cold tier for one or more data items relocated from the warm tier and satisfying the one or more index criteria for the requested cold tier index;
   generate a cold tier index directory file that comprises:
   identifiers for the one or more data items satisfying the one or more index criteria for inclusion in the cold tier index; and
   respective storage locations in the cold tier where the one or more data items satisfying the index criteria are stored; and
   responsive to receipt of a search request having one or more search parameters for the one or more attributes or metadata, perform a search according to the search request using the cold tier index directory file instead of the one or more cold tier directory files to locate one or more data items in the cold tier that satisfy the one or more search parameters.

2. The system of claim 1, wherein to include the one or more data items satisfying the one or more index criteria in the cold tier index, the one or more computing devices implementing the configuration manager are further configured to:
   generate a cold tier index file in response to the request; and
   add the one or more data items satisfying the one or more index criteria in the cold tier index file.

3. The system of claim 1, wherein the request further indicates a column attribute for the cold tier index, and wherein the configuration manager is further configured to:
   organize the one or more references in the cold tier index directory file according to the column attribute indicated in the request.

4. The system of claim 1, further comprising a resource manager configured to:
   relocate one or more particular data items from the warm tier to the cold tier in accordance with a tiering policy; or
   remove one or more superseded or deleted data items from the cold tier,
   wherein the configuration manager is further configured to:
   automatically update the cold tier index directory file to include identifiers for any of the one or more particular data items relocated from the warm tier to the cold tier that satisfy the one or more index criteria for the cold tier index; and
   automatically update the cold tier index directory file to not include identifiers for any of the one or more superseded or deleted data items.

5. The system of claim 1, wherein the one or more computing devices implementing the configuration manager further implement:
   a modify index application programming interface (API), wherein the configuration manager is configured to:
   receive an index modification request, via the modify index API; and
   modify the cold tier index directory file in accordance with one or more index modification criteria included in the index modification request;
   a list index API, wherein the configuration manager is configured to:
   receive an index list request, via the list index API; and
   generate a list of the one or more data items having respective identifiers included in the cold tier index directory file;
   a copy index API, wherein the configuration manager is configured to:
   receive an index copy request, via the copy index API; and
   generate a copy of the cold tier index directory file to be stored at a location specified in the index copy request;
   an index synchronization API, wherein the configuration manager is configured to:

receive, via the index synchronization API, an indication that the cold tier has been modified; and automatically update the cold tier index directory file to include any identifiers for relocated data items that have been added to the cold tier that satisfy the one or more index criteria for the cold tier index; or automatically update the cold tier index directory file to not include any identifiers for data items that have been removed from the cold tier; or a delete index API, wherein the configuration manager is configured to:

receive an index delete request specifying the cold tier index, via the delete index API; and delete the cold tier index directory file from the cold tier.

6. A method comprising:

storing data items in a cold tier of a data store including storing a plurality of the data items relocated from a warm tier into a flat file of one or more flat files of the cold tier, wherein the data store comprises a warm tier and the cold tier, wherein the warm tier has a lower latency for data access than the cold tier, and wherein the cold tier comprises one or more cold tier directory files comprising identifiers for the relocated data items and respective storage locations in the one or more flat files where the relocated data items are stored;

receiving a request to create a cold tier index for at least some of the data items stored in the one or more of the flat files within the cold tier, wherein the request indicates one or more index criteria for data items to be included in the cold tier index, wherein the one or more index criteria specify one or more attributes or meta-data for the data items other than the identifiers for the relocated data items in the one or more cold tier directory files;

in response to the request, generating a cold tier index directory file that comprises:

identifiers for the one or more data items satisfying the one or more index criteria for inclusion in the cold tier index; and respective storage locations in the cold tier where the one or more data items satisfying the index criteria are stored;

storing one or more additional data items in the cold tier, wherein the one or more additional data items are relocated from the warm tier to the cold tier in accordance with a tiering policy;

automatically updating the cold tier index directory file to include identifiers and respective storage locations for any of the one or more additional data items that satisfy the one or more index criteria for the cold tier index; and responsive to receipt of a search request having one or more search parameters for the one or more attributes or metadata, performing a search according to the search request using the cold tier index directory file instead of the one or more cold tier directory files to locate one or more data items in the cold tier that satisfy the one or more search parameters.

7. The method of claim 6, wherein the method further comprises:

searching the one or more flat files of the cold tier for those data items satisfying the one or more index criteria for the requested cold tier index.

8. The method of claim 7, wherein the cold tier index comprises:

a cold tier index file comprising the one or more data items added to the cold tier index.

9. The method of claim 6, wherein said automatically updating the cold tier index directory file is performed synchronously with relocating one or more data items from the warm tier to the cold tier or synchronously with removing one or more data items from the cold tier.

10. The method of claim 6, wherein said automatically updating the cold tier index directory file is performed asynchronously with relocating one or more data items from the warm tier to the cold tier or asynchronously with removing one or more data items from the cold tier.

11. The method of claim 6, wherein each data item comprises a key value, an item value, and one or more meta-data values, and wherein the request to create the cold tier index specifies the cold tier index is to include:

data items having respective key values satisfying at least one of the one or more index criteria;

data items having respective item values satisfying at least one of the one or more index criteria; or data items having meta-data values satisfying at least one of the one or more index criteria, wherein said generating the cold tier index directory file comprises adding identifiers for those data items with key values, item values, or meta-data values that satisfy key values, item values, or meta-data values as specified in the request.

12. The method of claim 6, wherein the cold tier index is a compact index including reference information for the data items added to the cold tier index directory file without including corresponding key values, item values, and meta-data values for each of the data items added to the cold tier index.

13. The method of claim 6, wherein the request to create the cold tier index indicates that the cold tier index is to be based on an existing warm tier index, the method further comprising:

applying one or more index criteria for the warm tier index as the one or more index criteria for those data items having identifiers to be added to the cold tier index directory file.

14. A non-transitory computer-readable medium storing program instructions, that when executed by one or more processors, cause the one or more processors to:

receive a request to create a cold tier index for data items stored in one or more flat files within a cold tier of a data store, wherein the data store comprises a warm tier and the cold tier and the cold tier comprises one or more cold tier directory files comprising identifiers for the data items and respective storage locations in the one or more flat files where the data items are stored, wherein the warm tier has a lower latency for data access than the cold tier, wherein data items stored in the cold tier have been relocated from the warm tier and at least one of the one or more flat files stores a plurality of the data items stored in the cold tier, wherein the request indicates one or more index criteria for data items relocated from the warm tier and stored in the cold tier that are to be included in the cold tier index, wherein the one or more index criteria specify one or more attributes or metadata for the data items other than the identifiers for the relocated data items in the one or more cold tier directory files;

generate a cold tier index directory file that comprises:

identifiers for the one or more data items satisfying the one or more index criteria for inclusion in the cold tier index; and respective storage locations in the cold tier where the one or more data items satisfying the index criteria are stored;

automatically update the cold tier index directory file to include identifiers for any additional data items stored in the cold tier in accordance with the request;

automatically update the cold tier index directory file to not include identifiers for any data items no longer stored in the cold tier; and responsive to receipt of a search request having one or more search parameters for the one or more attributes or metadata, perform a search according to the search request using the cold tier index directory file, instead of the one or more cold tier directory files, to locate one or more data items in the cold tier that satisfy the one or more search parameters.

15. The non-transitory computer-readable medium of claim 14, wherein to generate the cold tier index, the program instructions, when executed by the one or more processors, further cause the one or more processors to:

search the one or more flat files of the cold tier for the data items in accordance with the request.

16. The non-transitory computer-readable medium of claim 14, wherein the request comprises one or more index criteria to be satisfied for the data items stored in the cold tier that are to be included in the cold tier index, wherein the one or more index criteria comprise:

a value for the data items that are to be included in the cold tier index, wherein identifiers for data items having a value equal to the value included in the request are included in the cold tier index directory file;

a minimum value for the data items that are to be included in the cold tier index, wherein identifiers for data items having a value greater than the minimum value included in the request are included in the cold tier index directory file;

a maximum value for the data items that are to be included in the cold tier index, wherein identifiers for data items having a value less than the maximum value included in the request are included in the cold tier index directory file; or a similarity threshold for the data items that are to be included in the cold tier index, wherein identifiers for data items having one or more characteristics matching one or more characteristics specified in the request are included in the cold tier index directory file, wherein the one or more matching characteristics exceed the similarity threshold.

17. The non-transitory computer-readable medium of claim 16, wherein the request indicates that data items to be included in the cold tier index are to be selected based on key values, item values, or meta-data values for the data items, and wherein the value, the minimum value, the maximum value, or the similarity threshold are compared to key values, item values, or meta-data values of the data items stored in the cold tier in accordance with the request to determine data items stored in the cold tier to have respective identifiers be included in the cold tier index directory file.

18. The non-transitory computer-readable medium of claim 16, wherein the one or more index criteria further comprise one or more user specified constraints for those data items stored in the cold tier that are to be included in the cold tier index directory file.

19. The non-transitory computer-readable medium of claim 14, wherein the request to create the cold tier index is received via an interface configured to receive a request to create an index for data items stored in the warm tier and the cold tier.

20. The non-transitory computer-readable medium of claim 14, wherein the program instructions when executed by the one or more processors further cause the one or more processors to:

receive another search request seeking data items stored in the cold tier satisfying one or more other search parameters;

determine one or more index criteria based, at least in part, on the other search parameters; and generate one or more additional cold tier index directory files for at least some of the data items stored in the cold tier in accordance with the determined index criteria.

* * * * *